(12) United States Patent
Lugg et al.

(10) Patent No.: US 10,071,459 B2
(45) Date of Patent: Sep. 11, 2018

(54) MULTI-LAYERED POLISHING PADS

(71) Applicant: 3M INNOVATIVE PROPERTIES COMPANY, St. Paul, MN (US)

(72) Inventors: Paul S Lugg, Woodbury, MN (US); Duy K Lehuu, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 129 days.

(21) Appl. No.: 14/915,650

(22) PCT Filed: Sep. 23, 2014

(86) PCT No.: PCT/US2014/056966
§ 371 (c)(1),
(2) Date: Mar. 1, 2016

(87) PCT Pub. No.: WO2015/048011
PCT Pub. Date: Apr. 2, 2015

(65) Prior Publication Data
US 2016/0229023 A1 Aug. 11, 2016

Related U.S. Application Data

(60) Provisional application No. 62/019,068, filed on Jun. 30, 2014, provisional application No. 61/918,369, (Continued)

(51) Int. Cl.
*B24B 37/22* (2012.01)
*B24B 37/24* (2012.01)
(Continued)

(52) U.S. Cl.
CPC ............... *B24B 37/22* (2013.01); *B24B 7/20* (2013.01); *B24B 37/044* (2013.01); *B24B 37/24* (2013.01); *C09G 1/02* (2013.01); *B24B 37/26* (2013.01)

(58) Field of Classification Search
CPC ....... B24B 37/04; B24B 37/044; B24B 37/10; B24B 37/102; B24B 37/24; B24B 37/26;
(Continued)

(56) References Cited

U.S. PATENT DOCUMENTS 3,036,003 A 5/1962 Verdol
3,236,770 A 2/1966 Matson
(Continued)

FOREIGN PATENT DOCUMENTS

EP 1779971 5/2007
GB 791580 3/1958
(Continued)

OTHER PUBLICATIONS

EP Search Report, EP 14848408, dated Apr. 11, 2017 (6 pages).
(Continued)

*Primary Examiner* — Timothy V Eley
(74) *Attorney, Agent, or Firm* — Adam Bramwell

(57) ABSTRACT

A multi-layered polishing pad arrangement includes a first polishing pad layer having a first top and a first bottom major surface, a second polishing pad layer having a second top and a second bottom major surface, and a coupling arrangement disposed between the first bottom surface and the second top surface. The thickness of each of the first and second polishing pad layer ranges between 0.125 mm and 10 mm.

14 Claims, 3 Drawing Sheets

Related U.S. Application Data filed on Dec. 19, 2013, provisional application No. 61/882,369, filed on Sep. 25, 2013.

(51) Int. Cl.
| | |
|---|---|
| *B24B 37/04* | (2012.01) |
| *B24B 7/20* | (2006.01) |
| *C09G 1/02* | (2006.01) |
| *B24B 37/26* | (2012.01) |

(58) Field of Classification Search
CPC . B24D 3/10; B24D 3/18; B24D 11/00; C09G 1/02; C09K 3/1463
See application file for complete search history.

(56) References Cited

U.S. PATENT DOCUMENTS

| | | | |
|---|---|---|---|
| 3,275,554 | A | 9/1966 | Wagenaar |
| 3,414,347 | A | 12/1968 | Stoltze |
| 3,438,757 | A | 4/1969 | Honnen |
| 3,448,047 | A | 6/1969 | Traise |
| 3,454,555 | A | 7/1969 | Voort |
| 3,461,172 | A | 8/1969 | Previc |
| 3,539,633 | A | 11/1970 | Karll |
| 3,565,804 | A | 2/1971 | Honnen |
| 3,586,629 | A | 6/1971 | Otto |
| 3,591,598 | A | 7/1971 | Traise |
| 3,634,515 | A | 1/1972 | Piasek |
| 3,725,480 | A | 4/1973 | Traise |
| 3,726,882 | A | 4/1973 | Traise |
| 3,980,569 | A | 9/1976 | Pindar |
| 4,314,827 | A | 2/1982 | Leitheiser |
| 4,623,364 | A | 11/1986 | Cottringer |
| 4,744,802 | A | 5/1988 | Schwabel |
| 4,770,671 | A | 9/1988 | Monroe |
| 4,881,951 | A | 11/1989 | Wood |
| 5,152,917 | A | 10/1992 | Pieper |
| 5,157,088 | A | 10/1992 | Dishong |
| 5,256,752 | A | 10/1993 | Dishong |
| 5,310,455 | A | 5/1994 | Pasch |
| 5,378,251 | A | 1/1995 | Culler |
| 5,395,539 | A | 3/1995 | Chandler |
| 5,958,794 | A | 9/1999 | Bruxvoort |
| 6,183,346 | B1 | 2/2001 | Gagliardi |
| 6,194,318 | B1 | 2/2001 | Kaisaki |
| 6,241,596 | B1 | 6/2001 | Osterheld |
| 6,319,108 | B1 | 11/2001 | Adefris |
| 6,551,366 | B1 | 4/2003 | D'Souza |
| 6,620,508 | B2 | 9/2003 | Inoue |
| 6,679,758 | B2 | 1/2004 | Bright |
| 6,702,650 | B2 | 3/2004 | Adefris |
| 6,746,311 | B1 | 6/2004 | Kessel |
| 6,790,126 | B2 | 9/2004 | Wood |
| 7,226,345 | B1 | 6/2007 | Dornfeld |
| 7,381,121 | B2 | 6/2008 | Song |
| 7,399,330 | B2 | 7/2008 | Schwabel |
| 7,494,519 | B2 | 2/2009 | Fletcher |
| 7,594,845 | B2 | 9/2009 | Lugg |
| 8,162,723 | B2 | 4/2012 | Spiro |
| 8,308,528 | B2 | 11/2012 | Ward |
| 2002/0177390 | A1 | 11/2002 | Sabde |
| 2003/0134581 | A1 | 7/2003 | Wang |
| 2004/0127831 | A1 | 7/2004 | Sigurjonsson |
| 2004/0137831 | A1 | 7/2004 | Kollodge |
| 2005/0136669 | A1 | 6/2005 | Lee |
| 2006/0162260 | A1* | 7/2006 | Nho ................ B82Y 30/00 51/298 |
| 2011/0204027 | A1 | 8/2011 | Moriya |
| 2017/0173758 | A1* | 6/2017 | Lehuu ............ B24B 37/26 |
| 2017/0182629 | A1* | 6/2017 | Lehuu ............ B24B 37/26 |

FOREIGN PATENT DOCUMENTS

| | | |
|---|---|---|
| WO | WO 2002-38338 | 5/2002 |
| WO | WO 2015-047939 | 4/2015 |

OTHER PUBLICATIONS

EP Search Report, EP 14848991, dated Apr. 11, 2017 (6 pages).
Kasman, "Waste reduction in lapping sapphire and other compound semiconductor materials", Engis Coporation, May 17-20, 2010 (4 pages).
Ng, "Advancements in Lapping and Polishing with Diamond Slurries", Diamond Innovations, Apr. 23-26, 2012 (4 pages).
International Search Report for PCT International Application No. PCT/US14/56966 dated Feb. 11, 2015, 4 pages.

* cited by examiner

MULTI-LAYERED POLISHING PADS

CROSS REFERENCE TO RELATED APPLICATIONS

This application is a national stage filing under 35 U.S.C. 371 of PCT/US2014/056966, filed Sep. 23, 2014, which claims the benefit of U.S. Application No. 62/019,068, filed Jun. 30, 2014, U.S. Application No. 61/918,369, filed Dec. 19, 2013, and U.S. Application No. 61/882,369, filed Sep. 25, 2013, the disclosure of which is incorporated by reference in its/their entirety herein.

FIELD

The present disclosure relates to polishing pads useful for the polishing of substrates, and systems for and methods of using such polishing pads.

BACKGROUND

Various articles, systems, and methods have been introduced for the polishing of ultrahard substrates. Such articles, systems, and methods are described, for example, in E. Kasman, M. Irvin, CS Mantech Conference, May 17-20, 2010, Portland Oreg.; and K. Y. Ng, T. Dumm, CS Mantech Conference, April $23^{th}$-$26^{th}$, Boston, Mass.

SUMMARY

In some embodiments, a system for polishing a substrate is provided. The system includes a carrier assembly configured to receive and hold the substrate and a multi-layered polishing pad arrangement. The multi-layered polishing pad arrangement includes a first polishing pad layer having a first top and a first bottom major surface, a second polishing pad layer having a second top and a second bottom major surface, and a coupling arrangement disposed between the first bottom surface and the second top surface. The coupling layer is configured such that the first polishing pad layer is removable from the pad arrangement to expose the second top surface. The system further includes a platen. The multi-layered polishing pad is coupled to the platen such that the first top surface is adjacent a major surface of the substrate. The system is configured such that the multi-layered polishing pad arrangement is movable relative to the substrate to carry out a polishing operation.

In some embodiments, a method for polishing the surface of a substrate is provided. The method includes providing a substrate having a major surface to be polished and providing a system for polishing a substrate. The method further includes providing a polishing solution. The polishing solution includes a fluid component, and ceramic abrasive composites. The ceramic abrasive composites include individual abrasive particles dispersed in a porous ceramic matrix. The ceramic abrasive composites are dispersed in the fluid component. The method further includes contacting said major surface of the substrate with the multi-layered polishing pad and the polishing solution while there is relative motion between the multi-layered polishing pad and the substrate.

In some embodiments, an article for polishing the surface of a substrate is provided. The article includes a polishing pad. The polishing pad includes a base layer having a major surface and a plurality of cavities extending into the base layer from the major surface. Each of the cavities includes a cavity opening defined in the major surface of the base layer. The article further includes a plurality of ceramic abrasive composites. The ceramic abrasive composites include individual abrasive particles dispersed in a porous ceramic matrix.

One or more of the abrasive composites are held in the cavities such that the abrasive composite has a portion that extends beyond the cavity opening.

In some embodiments, a multi-layered polishing pad arrangement is provided. The arrangement includes a first polishing pad layer having a first top and a first bottom major surface, a second polishing pad layer having a second top and a second bottom major surface, and a coupling arrangement disposed between the first bottom surface and the second top surface. The thickness of each of the first and second polishing pad layer ranges between 0.125 mm and 10 mm.

In some embodiments, a system for polishing a substrate is provided. The system includes a carrier assembly configured to receive and hold the substrate and a polishing pad. The polishing pad includes a base layer having a first major surface and a second major surface opposite the first major surface, and a plurality of cavities extending into the base layer from the first major surface, wherein each of the cavities comprises a cavity opening defined in the first major surface. The system further includes a platen. The polishing pad is coupled to the platen such that the first major surface contacts the platen. The system is configured such that the polishing pad is movable relative to the substrate to carry out a polishing operation.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Definitions

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Currently, ultrahard substrate (e.g., sapphire substrates) finishing processes are fixed abrasive processes or abrasive processes that involve the use of abrasive charged metal plates followed by chemical mechanical polishing with colloidal silica slurry. The challenges of lapping and polishing ultrahard substrates have not been satisfied using known versions of such processes. For example, inadequate material removal rates, poor surface finish, sub surface damage, high cost, and overall process difficulty have all been associated with such known processes.

The present disclosure is directed to articles, systems, and methods useful for polishing ultrahard substrates that overcomes many of the aforementioned problems associated with conventional abrasive processes.

Figure 1:
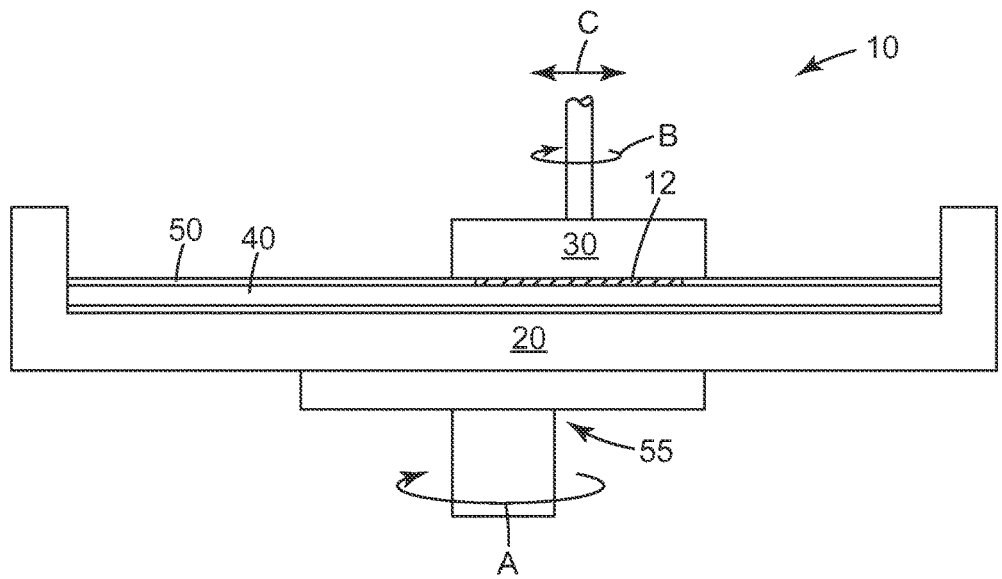
FIG. 1 illustrates a schematic of an example of a polishing system for utilizing the articles and methods in accordance with some embodiments of the present disclosure.

Mechanical and chemical-mechanical planarization processes remove material from the surface of substrates (e.g., semiconductor wafers, field emission displays, and many other microelectronic substrates) to form a flat surface at a desired elevation in the substrates. FIG. 1 schematically illustrates an example of a polishing system 10 for utilizing articles and methods in accordance with some embodiments of the present disclosure. As shown, the system 10 may include a platen 20, a carrier assembly 30, a polishing pad 40, and a layer of a polishing solution 50 disposed about a major surface of the polishing pad 40. During operation of the polishing system 10, a drive assembly 55 may rotate (arrow A) the platen 20 to move the polishing pad 40 to carry out a polishing operation. The polishing pad 40 and the polishing solution 50 may separately, or in combination, define a polishing environment that mechanically and/or chemically removes material from or polishes a major surface of a substrate 12. The polishing solution 50 may be provided to the polishing system 10 at a desired rate (which can be varied) via a suitable delivery mechanism (e.g., a pump). To polish the major surface of the substrate 12 with the polishing system 10, the carrier assembly 30 may press the substrate 12 against a polishing surface of the polishing pad 40 in the presence of the polishing solution 50. The platen 20 (and thus the polishing pad 40) and/or the carrier assembly 30 then move relative to one another to translate the substrate 12 across the polishing surface of the polishing pad 40. The carrier assembly 30 may rotate (arrow B) and optionally transverse laterally (arrow C). As a result, the abrasive particles (which may be contained in the polishing pad 40 and/or the polishing solution 50) and/or the chemicals in the polishing environment remove material from the surface of the substrate 12. It is to be appreciated that the polishing system 10 of FIG. 1 is only one example of a polishing system that may be employed in connection with the articles and methods of the present disclosure, and that other conventional polishing systems may be employed without deviating from the scope of the present disclosure.

Figure 2:
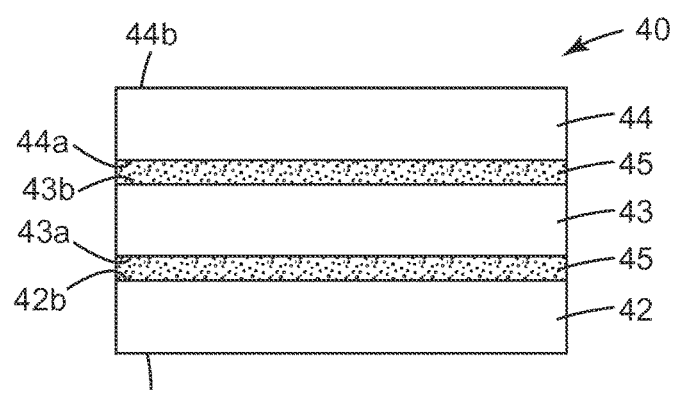
FIG. 2 illustrates a schematic cross-sectional view of a polishing pad in accordance with some embodiments of the present disclosure.

In some embodiments, the polishing pad 40 of the present disclosure may include a base layer of material having top and bottom major surfaces (e.g., top and bottom major substantially planar surfaces). As used herein, a top major surface of a polishing pad, or top major surface of a polishing pad layer, refers to a surface of the pad or a pad layer that is intended to contact the substrate 12 during a polishing operation. In further embodiments, the polishing pad 40 may be formed as a multi-layered polishing pad arrangement that includes two or more polishing pad layers that are each releasably coupled to their respective adjacent layers in the stack via a coupling arrangement. For example, as shown schematically in FIG. 2, the polishing pad 40 may include polishing pad layers 42, 43, 44, each having respective top and bottom major surfaces (42$a$/42$b$, 43$a$/43$b$, and 44$a$/44$b$). The bottom major surface 42$b$ of the polishing pad 42 may be releasably coupled to the top major surface 43$a$ of the polishing pad layer 43 via a coupling arrangement 45, and the bottom major surface 43$b$ of the polishing pad 43 may be releasably coupled to the top major surface 44$a$ of the polishing pad layer 44 via another coupling arrangement 45. Of course, the multi-layered polishing pad may include only two pad layers, or any number of polishing pad layers greater than the three depicted in FIG. 2, which are coupled to one another in an analogous fashion.

Generally, the coupling arrangements 45 may include one or more layers which are configured relative to each other and/or the polishing pad layers such that adjacent polishing pad layers in a multi-layered polishing pad arrangement may be uncoupled from one another to expose the top major surfaces of the polishing pad layers. By configuring the polishing pads in this manner, it is believed that after the useful life of a polishing pad layer has expired, such expired layer may simply be decoupled from the multi-layered polishing pad arrangement (e.g., peeled off of the arrangement) to expose a new polishing surface, thereby limiting the downtime associated with polishing pad replacement. Examples of layers that may be useful in the coupling arrangements 45 may include pressure sensitive adhesives layers, release coating layers, backing layers.

Figure 3:
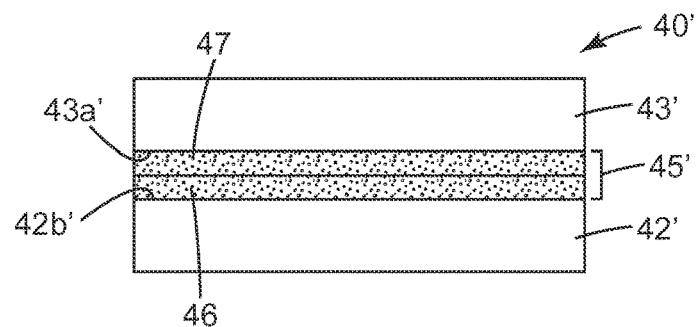
FIG. 3 illustrates a schematic cross-sectional view of a polishing pad in accordance with some embodiments of the present disclosure.

FIG. 3 is a schematic illustration of a multi-layered pad arrangement 40' in accordance with some embodiments. As shown, in some embodiments, the multi-layered pad arrangement 40' may include a first polishing pad layer 42' and a second polishing pad layer 43' that are releasably coupled to one another via a coupling arrangement 45'. The coupling arrangement 45' may include a pressure sensitive adhesive layer 46 disposed about and in contact with the bottom major surface 42$b$' of the first polishing pad layer 42', and a release layer 47 disposed about and in contact with the top major surface 43$a$' of the second polishing pad layer 43'. In such an embodiment, the pressure sensitive adhesive layer 46 and the release layer 47 may be configured such that upon application of a force to the first polishing pad layer 42', the polishing pad layer 42' and the pressure sensitive adhesive layer 46 may be removed from the pad arrangement 40' to expose the top surface 43a' of the pad layer 43'. In some embodiments, the force applied to the first polishing pad layer 42' may be a peel force. As used herein, a "peel force" refers to a force applied to an object in a direction that is substantially perpendicular to the plane of the surface on which the object rests. A force applied in a direction within 45° of the perpendicular direction may be considered a peel force. In some embodiments, following removal of the polishing pad layer 42' and the pressure sensitive adhesive layer 46, any portion of the release layer 47 that remains on top surface 43a' may be removed by an appropriate cleaning technique, by a pad conditioning process, and/or by the polishing process itself. Release layer 47 may also be soluble in the polishing solution. In some embodiments, release layer 47 may be removed along with the polishing pad layer 42' and the pressure sensitive adhesive layer 46.

Figure 4:
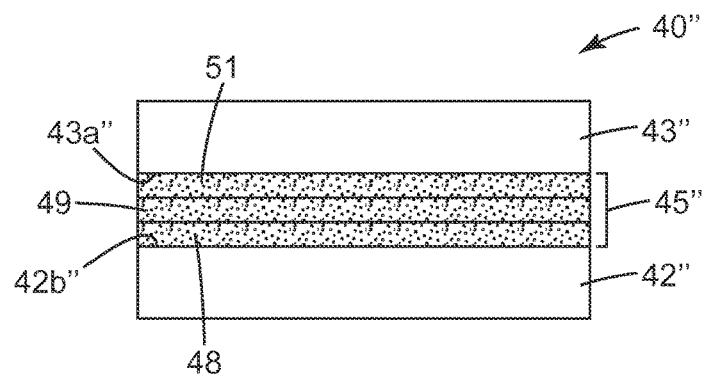
FIG. 4 illustrates a schematic cross-sectional view of a polishing pad in accordance with some embodiments of the present disclosure.

FIG. 4 is a schematic illustration of a multi-layered pad arrangement 40" in accordance with some embodiments. As shown, in some embodiments, the multi-layered pad arrangement 40" may include a first polishing pad layer 42" and a second polishing pad layer 43" that are releasably coupled to one another via a coupling arrangement 45". The coupling arrangement 45" may include a first pressure sensitive adhesive layer 48, a backing layer 49, and a second pressure sensitive adhesive layer 51. The first pressure sensitive adhesive layer 48 may be disposed about and in contact with the bottom major surface 42b" of the first polishing pad layer 42", the second pressure sensitive adhesive layer 51 may be disposed about and in contact with the top major surface 43a" of the second polishing pad layer 43", and the backing layer 49 may be disposed between the first and second pressure sensitive adhesive layers 48, 51. In such an embodiment, the layers of the coupling arrangement may be configured such that upon application of a force to the first polishing pad layer 42", the polishing pad layer 42" and the layers of the coupling arrangement 45" may be removed from the pad arrangement 40" to expose the top surface 43a" of the pad layer 43". That is, the layers of the coupling arrangement 45" may be configured such that the release force of the adhesion interface between the second pressure adhesive layer 51 and the top surface 43a" of the second polishing pad layer 43" is less than the release force of the adhesion interface of any other adjacent layers in the arrangement, including the first polishing pad layer 42" and the layers within the coupling arrangement 45". As used herein, the term "release force" refers to the force required to break an adhesive bond between two adjacent layers or materials. In some embodiments, the force applied to the first polishing pad layer 42" may be a peel force.

Figure 5:
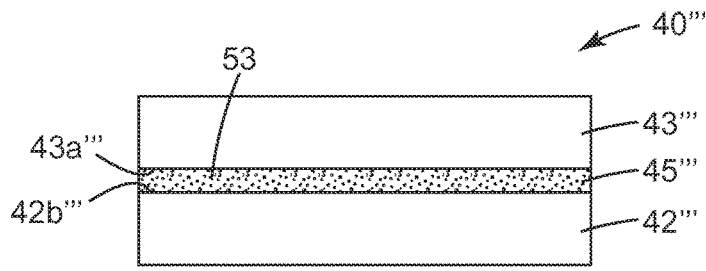
FIG. 5 illustrates a schematic cross-sectional view of a polishing pad in accordance with some embodiments of the present disclosure.

FIG. 5 is a schematic illustration of a multi-layered pad arrangement 40''' in accordance with some embodiments. As shown, in some embodiments, the multi-layered pad arrangement 40''' may include a first polishing pad layer 42''' and a second polishing pad layer 43''' that are releasably coupled to one another via a coupling arrangement 45'''. The coupling arrangement 45''' may include (or consist essentially of) a solvent soluble pressure sensitive adhesive layer 53. As used herein, the phrase "solvent soluble pressure sensitive adhesive" refers to pressure sensitive adhesives that are solvent soluble or solvent dispersable. The solvent soluble pressure sensitive adhesive layer 53 may be disposed about and in contact with the bottom major surface 42b''' of the first polishing pad layer 42''' and the top major surface 43a''' of the second polishing pad layer 43b. In such an embodiment, the layers of the coupling arrangement may be configured such that upon application of a force to the first polishing pad layer 42''', the polishing pad layer 42''' may be removed from the pad arrangement 40''' to expose the top surface 43a''' of the pad layer 43'''. Any portion of the solvent soluble pressure sensitive adhesive layer 53 that remains on the top surface 43a''' may then be removed, for example, by rinsing with an appropriate solvent. Removal of solvent soluble pressure sensitive adhesive layer 53 may also occur during the polishing process, if the polishing fluid includes a solvent that solvates solvent soluble pressure sensitive adhesive layer 53.

While FIGS. 3, 4, and 5 depict multi-layered polishing pad arrangements having only two polishing pad layers, any number of additional polishing pad layers may be included and be coupled to adjacent layers of the multi-layered arrangement via any of the coupling arrangements described above.

In any of the above described multi-layered arrangements, suitable pressure sensitive adhesive materials may include may include, without limitation, natural rubber, styrene butadiene rubber, styreneisoprene-styrene (co)polymers, styrene-butadiene-styrene (co)polymers, polyacrylates including (meth)acrylic (co)polymers, polyolefins such as polyisobutylene and polyisoprene, polyurethane, polyvinyl ethyl ether, polysiloxanes, silicones, polyurethanes, polyureas, or blends thereof. Suitable solvent soluble pressure sensitive adhesive materials may include, without limitation, those soluble in hexane, heptane, benzene, toluene, diethyl ether, chloroform, acetone, methanol, ethanol, water, or blends thereof. Suitable release layer materials may include, without limitation, silicone, polytetrafluoroethylene, lecithin, or blends thereof. Suitable backing layer materials may include, without limitation, paper, polyethylene terephthalate films, polypropylene films, polyolefins, or blends thereof.

Figure 6A:
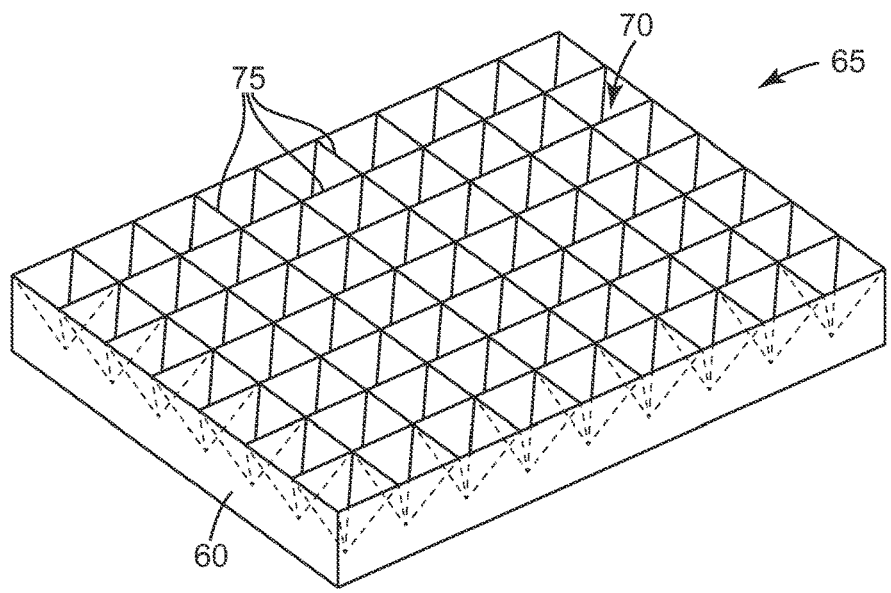
FIGS. 6A and 6B illustrate a perspective top view and a schematic cross-sectional view, respectively, of a polishing pad in accordance with some embodiments of the present disclosure.
Figure 6B:
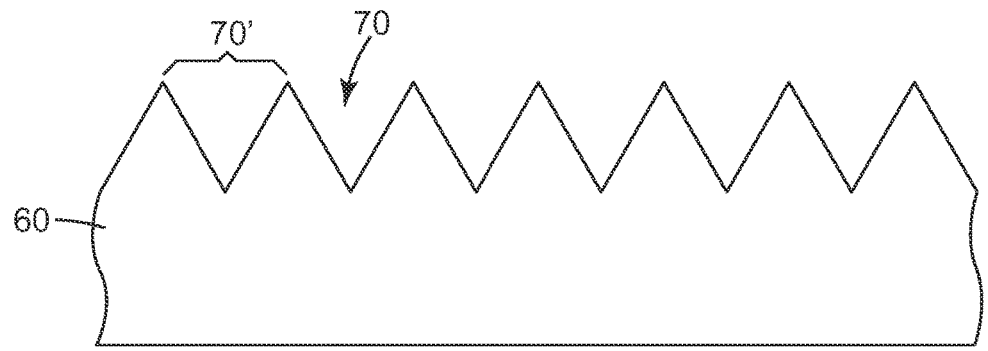

In various embodiments, one or more of the polishing pad layers may include a plurality of cavities that extend into the base layer from either or both of the top and bottom major surfaces of the base layer. For example, as shown in FIGS. 6A-6B, a polishing pad layer may include a base layer 60 having a first major surface 65 and of plurality of cavities 70, formed by cavity walls 75. The cavities extend into the base layer 60 from the first major surface 65. The cavities 70 may extend into the base layer 60 any desired distance (including entirely through the base layer 60). Alternatively, either or both of the first and second major surfaces of the base layer 60 may be continuous surfaces (i.e., not include cavities) or nearly continuous surfaces (i.e., include a minor amount of cavities or other surface disruptions). In embodiments in which a pad layer includes a first major surface having cavities and a second major surface that is continuous or nearly continuous, it is to be appreciated that either the first or second major surface may be employed as a working surface (i.e., surface that is intended to contact a substrate during a polishing operation). In either case, the surface region of the pad coincident with the surface area of the cavity walls is load bearing.

In various embodiments, the cavities 70 may have any size and shape. For example, the shape of the cavities may be selected from among a number of geometric shapes such as a cubic, cylindrical, prismatic, hemispherical, rectangular, pyramidal, truncated pyramidal, conical, truncated conical, cross, post-like with a bottom surface which is arcuate or flat, or combinations thereof. Alternatively, some or all of the cavities may have an irregular shape. In some embodiments, each of the cavities has the same shape. Alternatively, any number of the cavities may have a shape that is different from any number of the other cavities.

In various embodiments, one or more of the side or inner walls that form the cavities may be perpendicular relative to the top major surface or, alternatively, may be tapered in either direction (i.e., tapered toward the bottom of the cavity or the toward top of the cavity (toward the major surface)). The angle forming the taper can range from about 1 to 75 degrees, from about 2 to 50 degrees, from about 3 to 35 degrees, or from between about 5 to 15 degrees. The height, or depth, of the cavities can be at least 1 µm, at least 10 µm, or at least 800 µm; less than 10 mm, less than 5 mm, or less than 1 mm. The height of the cavities 70 may be the same, or one or more of the cavities may have a height that is different than any number of other cavities 70.

In some embodiments, the cavities 70 may have a cavity opening 70' defined in the first major surface 65, the cavity openings 70' having a length (the longest dimension of the cavity in the plane of the major surface) of at least 2 µm, at least 25 µm, at least 50 µm or at least 100 µm; less than 20 mm, less than 10 mm, less than 5 mm or less than 1 mm; and a width (the shortest dimension of the cavity in the plane of the major surface) of at least 2 µm, at least 25 µm, at least 50 µm or at least 100 µm; less than 20 mm, less than 10 mm, less than 5 mm or less than 1 mm. In various embodiments, one or more of the cavity openings 70' (up to all of the cavities) is non-groove like (that is, the length to width ratio of the cavity opening 70' is 1, less than 1.5, less than 2, or less than 3).

In illustrative embodiments, one or more (up to all) of the cavities may be formed as pyramids, or truncated pyramids. Such pyramidal shapes may have three to six sides (not including the base side), although a larger or smaller number of sides may be employed.

In some embodiments, the cavities 70 can be provided in an arrangement in which the cavities 70 are in aligned rows and columns. In some instances, one or more rows of cavities 70 can be directly aligned with an adjacent row of cavities 70. Alternatively, one or more rows of cavities 70 can be offset from an adjacent row of cavities 70. In further embodiments, the cavities 70 can be arranged in a spiral, helix, corkscrew, or lattice fashion. In still further embodiments, the cavities can be deployed in a "random" array (i.e., not in an organized pattern).

In various embodiments, the cavity openings 70' of the cavities 70 can abut (or nearly abut) one another or, alternatively, the cavity openings 70' may be separated from one another by some specified distance. The spacing of the cavity openings 70' can be at least 5,000 openings per linear cm, at least 400 openings per linear cm, at least 200 openings per linear cm or at least 100 openings per linear cm; less than 0.5 opening per linear cm, less than 1 opening per linear cm, less than 2 openings per linear cm or less than 10 openings per linear cm. In addition, the spacing can be varied such that the concentration of the cavity openings 70' is greater in one location than in another (e.g., the concentration may be greatest in the center of the major surface). In some embodiments, there is an area spacing density of at least 1 openings/4 cm$^2$, at least 1 openings/cm$^2$, at least 4 openings/cm$^2$, at least 100 openings/cm$^2$ or at least 1,000 openings/cm$^2$. The area spacing density of cavities ranges from about 1 opening/4 cm$^2$ to 40,000 openings/cm$^2$, about 20 to 10,000 openings/cm$^2$, or about 50 to 5,000 openings/cm$^2$. In illustrative embodiments, the area of the cavity openings 70' (in the plane of the first major surface 65) account for at least 30%, at least 40% least 50% at least 60%, at least 70%, at least 80%, at least 90%, at least 95%, or at least 97% of the total area of the first major surface 65.

In some embodiments, in conjunction with any of the previously described embodiments, one or more (up to all) of the cavities 70 among the array of cavities may be at least partially filled with a material to facilitate performance improvements of the polishing pad. Suitable cavity filling materials may include ductile metals, waxes, polishing pitch, or combinations thereof. The cavity filling material may fill any portion (up to all) of the volume of a cavity. Each of the cavities may be provided with the same cavity filling material and/or filling levels, or may be provided with different filling materials and/or filling levels. By creating a cavity having a low bearing area, the effective pressure can be increased thus increasing the removal rates, as associated with the Preston equation, and the like. Filling the cavity with a resilient or ductile material such as polishing pitch or foam may have little impact on the bearing area since the particles will reflect away from the workpiece, however the "filling" may effectively supply the abrasive working particles to the point of the working bearing area. If the cavity is too deep, particles may deposit in the base of the cavity and potentially be removed from the active polishing region or bearing area. Foam material such as porous polyurethane is another example of cavity filler used to create a delivery of abrasive particles to the high pressure region. Loosely bound particle additives such as plated white alumina may also be added to the cavities as a grinding aid, to enhance the removal rate or surface finish of the workpiece being polished.

In illustrative embodiments, any of the polishing pad layers may be formed of a polymeric material. For example, the polishing pad and/or the base layer of the polishing pad may be formed from thermoplastics, for example; polypropylene, polyethylene, polycarbonate, polyurethane, polytetrafluoroethylene, polyethylene teraphthalate, polyethylene oxide, polysulphone, polyetherketone, polyetheretherketone, polyimides, polyphenylene sulfide, polystyrene, polyoxymethylene plastic, and the like; thermosets, for example polyurethanes, epoxy resin, phenoxy resins, phenolic resins, melamine resins, polyimides and urea-formaldehyde resins, radiation cured resins, or combinations thereof. In some embodiments, any of the polishing pad layers may be formed from a soft metal material such as, for example copper, tin, zinc, silver, bismuth, antimony, or alloys thereof. The polishing pad layers may consist essentially of only one layer of material, or may have a multilayered construction.

The number of polishing pad layers in the polishing pad arrangement is not particularly limited; however, it may depend on geometrical constraints associated with the polishing tool upon which the polishing pad arrangement is to be used. In some embodiments, the number of polishing layers in the polishing pad arrangement is at least 1, at least 2, at least 3, at least 4, or even at least 5 and may be no greater than 500, no greater than 250, no greater than 100, or even no greater than 50. The polishing pad arrangement, or each polishing pad layer of the arrangement, may have any shape and thickness. However, the thickness of a polishing pad layer may influence the stiffness of the layer, which in turn can affect polishing results, particularly the planarity and/or flatness of the substrate being polished. In some embodiments, the thickness of each polishing pad layer (i.e., the dimension in a direction normal to the major surfaces) may be less than 10 mm, less than 5 mm, less than 2.5 mm, less than 1 mm, less than 0.5 mm, less than 0.25 mm, less than 0.125 mm, or less than 0.05 mm. In some embodiments, the thickness of each polishing pad layer is greater than 0.125 mm, greater than 0.25 mm, greater than 0.50 mm, greater than 0.75 mm or even greater than 1 mm.

In some embodiments the thickness of the polishing pad layer ranges between 0.125 mm and 10 mm, between 0.125 mm and 5 mm, or between about 0.25 mm and 5 mm. In some embodiments, the shape of the polishing pad arrangement may conform to the shape of the platen upon which the multi-layered polishing pad arrangement is to be mounted. For example, the polishing pad arrangement may be configured in the shape of a circle or annulus having a diameter that corresponds to the diameter of a platen upon which the multi-layered polishing pad arrangement is to be mounted. In some embodiments, the polishing pad arrangement may conform to the shape of the platen within a tolerance of ±10%.

In some embodiments, the polishing pad of the present disclosure may be a fixed abrasive pad. The fixed abrasive pad may be two-dimensional, i.e. a convention abrasive sheet with a layer of abrasive particles held to a backing by one or more resin or binder layers, or it may be a three-dimensional fixed abrasive, i.e. a resin or binder layer that contains abrasive particles dispersed therein, forming a resin/abrasive composite which has appropriate height to allow for the resin/abrasive composite to wear during use and/or dressing to expose a fresh layer of abrasive particles. The abrasive article may comprise a three-dimensional, textured, flexible, fixed abrasive construction having a first surface and a working surface. The working surface may comprise a plurality of precisely shaped abrasive composites. The precisely shaped abrasive composite may comprise a resin phase and an abrasive phase.

The precisely shaped abrasive composites may be arranged in an array to form the three-dimensional, textured, flexible, fixed abrasive construction. Suitable arrays include, for instance, those described in U.S. Pat. No. 5,958,794 (Bruxvoort et al.). The abrasive article may comprise abrasive constructions that are patterned. Abrasive articles available under the trade designation TRIZACT abrasive and TRIZACT diamond tile abrasives available from 3M Company, St. Paul, Minn., are exemplary patterned abrasives. Patterned abrasive articles include monolithic rows of abrasive composites precisely aligned and manufactured from a die, mold, or other techniques. Such patterned abrasive articles can abrade, polish, or simultaneously abrade and polish.

The abrasive article may include a three-dimensional, textured, flexible, fixed abrasive construction having a first surface and a working surface. In some embodiments, the first surface may further be in contact with a backing, optionally with an adhesive interposed therebetween. Any variety of backing materials are contemplated, including both flexible backings and backings that are more rigid. Examples of flexible backings include, for instance, polymeric film, primed polymeric film, metal foil, cloth, paper, vulcanized fiber, nonwovens and treated versions thereof and combinations thereof. Examples include polymeric films of polyester, and co-polyester, micro-voided polyester, polyimide, polycarbonate, polyamide, polyvinyl alcohol, polypropylene, polyethylene, and the like. When used as a backing, the thickness of a polymeric film backing is chosen such that a desired range of flexibility is retained in the abrasive article.

The shape of each precisely shaped abrasive composite may be selected for the particular application (e.g., workpiece material, working surface shape, contact surface shape, temperature, resin phase material). The shape of each precisely shaped abrasive composite may be any useful shape, e.g., cubic, cylindrical, prismatic, right parallelepiped, pyramidal, truncated pyramidal, conical, hemispherical, truncated conical, cross, or post-like sections with a distal end. Composite pyramids may, for instance, have three, four sides, five sides, or six sides. The cross-sectional shape of the abrasive composite at the base may differ from the cross-sectional shape at the distal end. The transition between these shapes may be smooth and continuous or may occur in discrete steps. The precisely shaped abrasive composites may also have a mixture of different shapes. The precisely shaped abrasive composites may be arranged in rows, spiral, helix, or lattice fashion, or may be randomly placed. The precisely shaped abrasive composites may be arranged in a design meant to guide fluid flow and/or facilitate swarf removal.

The lateral sides forming the precisely shaped abrasive composite may be tapered with diminishing width toward the distal end. The tapered angle may be from about 1 to less than 90 degrees, for instance, from about 1 to about 75 degrees, from about 3 to about 35 degrees, or from about 5 to about 15 degrees. The height of each precisely shaped abrasive composite is preferably the same, but it is possible to have precisely shaped abrasive composites of varying heights in a single article.

The base of the precisely shaped abrasive composites may abut one another or, alternatively, the bases of adjacent precisely shaped abrasive composites may be separated from one another by some specified distance. In some embodiments, the physical contact between adjacent abrasive composites involves no more than 33% of the vertical height dimension of each contacting precisely shaped abrasive composite. This definition of abutting also includes an arrangement where adjacent precisely shaped abrasive composites share a common land or bridge-like structure which contacts and extends between facing lateral surfaces of the precisely shaped abrasive composites. The abrasives are adjacent in the sense that no intervening composite is located on a direct imaginary line drawn between the centers of the precisely shaped abrasive composites.

The precisely shaped abrasive composites may be set out in a predetermined pattern or at a predetermined location within the abrasive article. For example, when the abrasive article is made by providing an abrasive/resin slurry between a backing and mold, the predetermined pattern of the precisely shaped abrasive composites will correspond to the pattern of the mold. The pattern is thus reproducible from abrasive article to abrasive article.

The predetermined patterns may be in an array or arrangement, by which is meant that the composites are in a designed array such as aligned rows and columns, or alternating offset rows and columns. In another embodiment, the abrasive composites may be set out in a "random" array or pattern. By this is meant that the composites are not in a regular array of rows and columns as described above. It is understood, however, that this "random" array is a predetermined pattern in that the location of the precisely shaped abrasive composites is predetermined and corresponds to the mold.

In some embodiments, the resin phase may include a cured or curable organic material. The method of curing is not critical, and may include, for instance, curing via energy such as UV light or heat. Examples of suitable resin phase materials include, for instance, amino resins, alkylated urea-formaldehyde resins, melamine-formaldehyde resins, and alkylated benzoguanamine-formaldehyde resins. Other resin phase materials include, for instance, acrylate resins (including acrylates and methacrylates), phenolic resins, urethane resins, and epoxy resins. Particular acrylate resins include, for instance, vinyl acrylates, acrylated epoxies, acrylated urethanes, acrylated oils, and acrylated silicones. Particular phenolic resins include, for instance, resole and novolac resins, and phenolic/latex resins. The resins may further contain conventional fillers and curing agents such as are described, for instance, in U.S. Pat. No. 5,958,794 (Bruxvoort et al.), incorporated herein by reference.

Examples of suitable abrasive particles for the fixed abrasive pad include fused aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, garnet, fused alumina zirconia, alumina-based sol gel derived abrasive particles and the like. The alumina abrasive particle may contain a metal oxide modifier. Examples of alumina-based sol gel derived abrasive particles can be found in U.S. Pat. Nos. 4,314,827; 4,623,364; 4,744,802; 4,770,671; and 4,881,951, all incorporated herein by reference. The diamond and cubic boron nitride abrasive particles may be mono crystalline or polycrystalline. Other examples of suitable inorganic abrasive particles include silica, iron oxide, chromia, ceria, zirconia, titania, tin oxide, gamma alumina, and the like.

In some embodiments, the polishing pads of the present disclosure, including the multi-layered pad arrangements, may include one or more additional layers. For example, the polishing pads may include adhesive layers such as pressure sensitive adhesives, hot melt adhesives, or epoxies. "Sub pads" such as thermoplastic layers, e.g. polycarbonate layers, which may impart greater stiffness to the pad, may be used for global planarity. Sub pads may also include compressible material layers, e.g., foamed material layers. Sub pads which include combinations of both thermoplastic and compressible material layers may also be used. Additionally, or alternatively, metallic films for static elimination or sensor signal monitoring, optically clear layers for light transmission, foam layers for finer finish of the workpiece, or ribbed materials for imparting a "hard band" or stiff region to the polishing surface may be included.

As will be appreciated by those skilled in the art, the polishing pads of the present disclosure can be formed according to a variety of methods including, e.g., molding, extruding, embossing and combinations thereof.

The present disclosure further relates to polishing fluids that may used, along with the polishing pads of the present disclosure, in a polishing operation. In some embodiments, the polishing solutions (depicted as reference number 50 in FIG. 1, and commonly referred to as a "slurry") of the present disclosure may include a fluid component having abrasive composites dispersed and/or suspended therein.

In various embodiments, the fluid component may be non-aqueous or aqueous. A non-aqueous fluid is defined as having at least 50% by weight of a non-aqueous fluid, e.g., an organic solvent. An aqueous fluid is defined as having at least 50% by weight water. Non aqueous fluid components may include alcohols; e.g., ethanol, propanol, isopropanol, butanol, ethylene glycol, propylene glycol, glycerol, polyethylene glycol, triethylene glycol; acetates, e.g. ethyl acetate, butyl acetate; ketones, e.g. methyl ethyl ketone, organic acids, e.g., acetic acid; ethers; triethanolamine; complexes of triethanolamine such as silitrane or boron equivalents, or combinations thereof. Aqueous fluid components may include (in addition to water) non-aqueous fluid components, including any of the non-aqueous fluids described above. The fluid component may consist essentially of water, or the amount of water in the fluid component may be at least 50% by weight, at least 70% by weight, at least 90% by weight or at least 95% by weight. The fluid component may consist essentially of a non-aqueous fluid, or the amount of non-aqueous fluid in the fluid component may be at least 50% by weight, at least 70% by weight, at least 90% by weight or at least 95% by weight. When the fluid component includes both aqueous and non-aqueous fluids, the resulting fluid component may be homogeneous, i.e. a single phase solution.

In illustrative embodiments, the fluid component may be selected such that the abrasive composite particles are insoluble in the fluid component.

In some embodiments, the fluid component may further include one or more additives such as, for example, dispersion aids, rheology modifiers, corrosion inhibitors, pH modifiers, surfactants, chelating agents/complexing agents, passivating agents, foam inhibitor, and combinations thereof. Dispersion aids are often added to prevent the sagging, settling, precipitation, and/or flocculation of the agglomerate particles within the slurry, which may lead to inconsistent or unfavorable polishing performance. Useful dispersants may include amine dispersants, which are reaction products of relatively high molecular weight aliphatic or alicyclic halides and amines, such as polyalkylene polyamines and Mannich dispersants, which are the reaction products of alkyl phenols in which the alkyl group contains at least 30 carbon atoms with aldehydes (especially formaldehyde) and amines (especially polyalkylene polyamines). Examples of amine dispersants are described in U.S. Pat. Nos. 3,275,554; 3,438,757; 3,454,555, and 3,565,804, all incorporated herein by reference. Examples of Mannich dispersants are described in U.S. Pat. Nos. 3,036,003; 3,236,770; 3,414, 347; 3,448,047; 3,461,172; 3,539,633; 3,586,629; 3,591, 598; 3,634,515; 3,725,480; 3,726,882, and 3,980,569, incorporated herein by reference.

Dispersive aids which provide steric stabilization may be used, such as those available under the trade designation SOLSPERSE, CARBOSPERSE and IRCOSPERSE, from Lubrizol Corporation, Wickliffe, Ohio. Additional dispersants include DISPERBYK additives such as DISPERBYK 180 from BYK Additives and Instruments, Wesel, Germany and DISPERS additives, including TEGO DISPERS 652, TEGO DISPERS 656 and TEGO DISPERSE 670, from Evonik Industries Hopewell, Va. Dispersion aids may be used alone or in combination of two or more.

Rheology modifiers may include shear thinning and shear thickening agents. Shear-thinning agents may include polyamide waxes coated on polyolefin polymer material available under the trade designation DISPARLON from King Industries, Inc, Norwalk, Conn., including DISPARLON AQH-800, DISPARLON 6100, DISPARLON BB-102. Certain clays, such as Montmorillonite clay, may also be added as a shear thinning agent. Rheology modifiers may be used alone or in combination of two or more.

Thickening agents may include fumed silica, such as those available under the trade designation CAB-O-SIL from Cabot Corporation, Boston, Mass. and AEROSIL from Evonik Industires; SOLTHIX RHEOLOGY MODIFIERS and IRCOGEL from Lubrizol Corporation; water-soluble polymers, e.g. polyvinylpyrrolidone, polyethyleneimine, cellulose derivatives (hydroxypropylmethyl cellulose, hydroxyethyl cellulose, cellulose acetate butyrate, etc.) polyvinyl alcohol, poly(meth)acrylic acid, polyethylene glycol, poly(meth)acrylamide, polystyrene sulfonate, or any combinations thereof; non-aqueous polymers, e.g., polyolefins, styrene/maleic ester copolymers, and similar polymeric substances including homopolymers, copolymers and graft copolymers. The agents may comprise a nitrogen-containing methacrylate polymer, for example, a nitrogen-containing methacrylate polymer derived from methyl methacrylate and dimethylaminopropyl amine. Examples of commercially available materials include polyisobutylenes, such as INDOPAL from BP, London, England and or PARAPOL from ExxonMobil, Irving, Tex.; olefin copolymers, such as LUBRIZOL 7060, 7065, and 7067 from Lubrizol Corporation and LUCANT HC-2000L and LUCANT HC-600 from Mitsui Chemicals, Tokyo, Japan; hydrogenated styrene-diene copolymers, such as SHELLVIS 40 and SHELLVIS 50 from Shell Chemicals, Houston, Tex. and LZ 7308 and LZ 7318 from Lubrizol Corporation; styrene/maleate copolymers, such as LZ 3702 and LZ 3715 from Lubrizol Corporation; polymethacrylates, such as those available under the trade designation VISCOPLEX from Evonik RohMax USA, Inc., Horsham, Pa., HITEC series of viscosity index improvers from Afton Chemical Corporation, Richmond, Va., and LZ 7702, LZ 7727, LZ7725 and LZ 7720C from Lubrizol Corporation; olefin-graft-polymethacrylate polymers such as VISCOPLEX 2-500 and VISCOPLEX 2-600 from Evonik RohMax USA, Inc.; and hydrogenated polyisoprene star polymers, such as SHELLVIS 200 and SHELLVIS 260, from Shell Chemicals. Other materials include methacrylate polymers with radial or star architecture, such as ASTERIC polymers from Lubrizol Corporation. Viscosity modifiers that may be used are described in U.S. Pat. Nos. 5,157,088; 5,256,752 and 5,395,539, incorporated herein by reference. Viscosity modifiers may be used alone or in combination of two or more.

Corrosion inhibitors that may be added to the fluid component include alkaline materials, which can neutralize the acidic byproducts of the polishing process that can degrade metal such as triethanolamine, fatty amines, octylamine octanoate, and condensation products of dodecenyl succinic acid or anhydride and a fatty acid such as oleic acid with a polyamine. Corrosions inhibitors may be used alone or in combination of two or more.

Suitable pH modifiers which may be used include alkali metal hydroxides, alkaline earth metal hydroxides, basic salts, organic amines, ammonia, and ammonium salts. Examples include potassium hydroxide, sodium hydroxide, calcium hydroxide, ammonium hydroxide, sodium borate, ammonium chloride, triethylamine, triethanolamine, diethanolamine, and ethylenediamine. Some pH modifiers, such as diethanolamine and triethanolamine, may also be capable of forming chelate complexes with metal impurities such as aluminum ions during metal polishing. Buffer systems may also be employed. The buffers can be adjusted to span the pH range from acidic to near-neutral to basic. Polyprotic acids act as buffers, and when fully or partially neutralized with ammonium hydroxide to make ammonium salts, they are representative examples including systems of phosphoric acid-ammonium phosphate; polyphosphoric acid-ammonium polyphosphate; the boric acid-ammonium tetraborate; boric acid-ammonium pentaborate pH modifiers may be used alone or in combination of two or more. Other buffers include tri- and potyprotic protolytes and their salts (e.g., ammonium salts). These may include ammonium ion buffer systems based on the following protolytes, all of which have at least one pKa greater than 7: aspartic acid, glutamic acid, histidine, lysine, arginine, ornithine, cysteine, tyrosine, and carnosine.

Surfactants that may be used include ionic and nonionic surfactants. Nonionic surfactants may include polymers containing hydrophilic and hydrophobic segments, such as polypropylene glycol)-block-poly(ethylene glycol)-block-polypropylene glycol) available under the trade designation PLURONIC from BASF Corporation, Florham Park, N.J.; poly(ethylene)-block-poly(ethylene glycol) available under the trade designation BRIJ from Croda International PLC, Edison, N.J.; nonylphenol ethoxylate available under the trade designation TERGITOL from Dow Chemical, Midland, Mich. and polyethylene glycol sorbitan monostearate available under the trade designation TWEEN 60 and other TWEEN surfactants from Croda International PLC.

Ionic surfactants may include both cationic surfactants and anionic surfactants. Cationic surfactants include quaternary ammonium salts, sulfonates, carboxylates, linear alkylamines. alkylbenzene sulfonates (detergents), (fatty acid) soaps, lauryl sulfates, di-alkyl sulfosuccinate and lignosulfonates. Anionic Surfactants are dissociated in water in an amphiphilic anion, and a cation, which is in general an alkaline metal (Na+, K+) or a quaternary ammonium. Types include Laureth-carboxylic acid such as AKYPO RLM-25 from KAO Chemicals, Kao Specialties Americas LLC, High Point, N.C. Surfactants may be used alone or in combination of two or more.

Complexing agents, such as ligands and chelating agents, may be included in the fluid component, particularly when the application relates to metal finishing or polishing, where metal swarf and or metal ions may be present in the fluid component during use. The oxidation and dissolution of metal can be enhanced by the addition of complexing agents. These compounds can bond to metal to increase the solubility of metal or metal oxides in aqueous and non-aqueous liquids, as generally described in Cotton & Wilkinson; and Hathaway in Comprehensive Coordination Chemistry, Vol. 5; Wilkinson, Gillard, McCleverty, Eds. Suitable additives that may be added to or used in the liquid component include monodentate complexing agents, such as ammonia, amines, halides, pseudohalides, carboxylates, thiolates, and the like also called ligands. Other additives that may be added to the working liquid include multidentate complexing agents, typically multidentate amines. Suitable multidentate amines include ethylenediamine, diethylene-triamine, triethylenetetramine, or combinations thereof. Combinations of the two monodentate and polydentate complexing agents include amino acids such as glycine, and common analytical chelating agents such as EDTA-ethylenediaminetetraacetic acid and its numerous analogs. Additional chelators include: polyphosphates, 1,3-diketones, aminoalcohols, aromatic heterocyclic bases, phenols, aminophenols, oximes, Schiff bases, and sulfur compounds. Examples of suitable complexing agents (particularly in the case when metal oxide surfaces are being polished) include ammonium salts such as $NH_4 HCO_3$, tannic acid, catechol, $Ce(OH)(NO)_3$; $Ce(SO_4)_2$, phthalic acid, salicyclic acid and the like.

Complexing agents may include carboxylic acids and salts thereof that having one carboxyl group (i.e., monofunctional carboxylic acids) or a plurality of carboxylic acid groups (i.e., multifunctional carboxylic acids), e.g., difunctional carboxylic acids (i.e., dicarboxylic acids) and trifunctional carboxylic acids (i.e., tricarboxylic acids). As used herein, the terms "monofunctional", "difunctional", "trifunctional," and "multifunctional" refer to the number of carboxyl groups on the acid molecule. Complexing agents may include simple carboxylic acids, which consist of carbon, hydrogen, and one or more carboxyl groups. Exemplary monofunctional simple carboxylic acids include, e.g., formic, acetic, propionic, butyric, isobutyric acid, 3-butenoic acid, capric, lauric, stearic, oleic, linoleic, linolenic, phenylacetic, benzoic, and toluic acids. Exemplary multifunctional simple carboxylic acids include, e.g., oxalic, malonic, methylmalonic, succinic, glutaric, adipic, maleic, fumaric, phthalic, isophthalic, and terephthalic acids. Complexing agents may include substituted carboxylic acids contain one or more substituents, e.g., halides, hydroxyl groups, amino groups, ether groups, and/or carbonyl groups in addition to the one or more carboxyl groups. Hydroxycarboxylic acids, which comprise one or more hydroxyl groups, are one class of substituted carboxylic acid. Exemplary hydroxy-carboxylic acids include monofunctional hydroxy-carboxylic acids and multifunctional hydroxy-carboxylic acids. Exemplary monofunctional hydroxy-carboxylic acids include glyceric acid (i.e., 2,3-dihydroxypropanoic acid), glycolic acid, lactic acid (e.g., L-lactic, D-lactic, and DL-lactic acids), hydroxy-butanoic acid, 3-hydroxypropionic acid, gluconic acid and methyllactic acid (i.e., 2-hydroxyisobutyric acid). Exemplary multifunctional hydroxy-carboxylic acids include make acid and tartaric acid (difunctional hydroxy-carboxylic acids) and citric acid (a trifunctional hydroxy-carboxylic acid). Complexing agents may be used alone or in combination of two or more.

Passivating agents may be added to the fluid component to create a passivating layer on the substrate being polished, thereby altering the removal rate of a given substrate or adjusting the removal rate of one material relative to another material, when the substrate contains a surface that includes two or more different materials. Passivating agents known in the art for passivating metal substrates may be used, including benzotriazole and corresponding analogs. Passivating agents known to passivate inorganic oxide substrates, include amino acids, e.g. glycine, aspartic acid, glutamic acid, histidine, lysine, proline, arginine, cysteine, and tyronsine may be used. Additionally, ionic and non-ionic surfactants may also function as passivating agents. Passivating agents may be used alone or in combination of two or more, e.g. an amino acid and a surfactant.

Foam inhibitors that may be used include silicones; copolymers of ethyl acrylate and 2-ethylhexylacrylate, which can optionally further include vinyl acetate; and demulsifiers including trialkyl phosphates, polyethylene glycols, polyethylene oxides, polypropylene oxides and (ethylene oxide-propylene oxide) polymers. Foam inhibitors may be used alone or in combination of two or more. Other additives that may be useful in the fluid component include oxidizing and/or bleaching agents such as, e.g. hydrogen peroxide, nitric acid, and transition metal complexes such as ferric nitrate; lubricants; biocides; soaps and the like.

In various embodiments, the concentration of an additive class, i.e. the concentration of one or more additives from a single additive class, in the polishing solution may be at least about 0.01 wt. %, at least about, 0.1 wt. %, at least about 0.25 wt. %, at least about 0.5 or at least about 1.0 wt. %; less than about 20 wt. %, less than about 10 wt. %, less than about 5 wt. % or less than about 3 wt % based on the weight of the polishing solution.

In illustrative embodiments, the abrasive composites of the present disclosure may include porous ceramic abrasive composites. The porous ceramic abrasive composites may include individual abrasive particles dispersed in a porous ceramic matrix. As used herein the term "ceramic matrix" includes both glassy and crystalline ceramic materials. These materials generally fall within the same category when considering atomic structure. The bonding of the adjacent atoms is the result of process of electron transfer or electron sharing. Alternatively, weaker bonds as a result of attraction of positive and negative charge known as secondary bond can exist. Crystalline ceramics, glass and glass ceramics have ionic and covalent bonding. Ionic bonding is achieved as a result of electron transfer from one atom to another. Covalent bonding is the result of sharing valence electrons and is highly directional. By way of comparison, the primary bond in metals is known as a metallic bond and involves non-directional sharing of electrons. Crystalline ceramics can be subdivided into silica based silicates (such as fireclay, mullite, porcelain, and Portland cement), non-silicate oxides (e.g., alumna, magnesia, $MgAl_2O_4$, and zirconia) and non-oxide ceramics (e.g., carbides, nitrides and graphite). Glass ceramics are comparable in composition with crystalline ceramics. As a result of specific processing techniques, these materials do not have the long range order crystalline ceramics do.

In illustrative embodiments, at least a portion of the ceramic matrix includes glassy ceramic material. In further embodiments, the ceramic matrix includes at least 50% by weight, 70% by weight, 75% by weight, 80% by weight, or 90% by weight glassy ceramic material. In one embodiment, the ceramic matrix consists essentially of glassy ceramic material.

In various embodiments, the ceramic matrixes may include glasses that include metal oxides, for example, aluminum oxide, boron oxide, silicon oxide, magnesium oxide, sodium oxide, manganese oxide, zinc oxide, and mixtures thereof. A ceramic matrix may include alumina-borosilicate glass including $Si_2O$, $B_2O_3$, and $Al_2O_3$. The alumina-borosilicate glass may include about 18% $B_2O_3$, 8.5% $Al_2O_3$, 2.8% BaO, 1.1% CaO, 2.1% $Na_2O$, 1.0% $Li_2O$ with the balance being $Si_2O$. Such an alumina-borosilicate glass is commercially available from Specialty Glass Incorporated, Oldsmar Fla.

As used herein the term "porous" is used to describe the structure of the ceramic matrix which is characterized by having pores or voids distributed throughout its mass. The pores may be open to the external surface of the composite or sealed. Pores in the ceramic matrix are believed to aid in the controlled breakdown of the ceramic abrasive composites leading to a release of used (i.e., dull) abrasive particles from the composites. The pores may also increase the performance (e.g., cut rate and surface finish) of the abrasive article, by providing a path for the removal of swarf and used abrasive particles from the interface between the abrasive article and the workpiece. The voids may comprise from about at least 4 volume % of the composite, at least 7 volume % of the composite, at least 10 volume % of the composite, or at least 20 volume % of the composite; less than 95 volume % of the composite, less than 90 volume % of the composite, less than 80 volume % of the composite, or less than 70 volume % of the composite. A porous ceramic matrix may be formed by techniques well known in the art, for example, by controlled firing of a ceramic matrix precursor or by the inclusion of pore forming agents, for example, glass bubbles, in the ceramic matrix precursor.

In some embodiments, the abrasive particles may include diamond, cubic boron nitride, fused aluminum oxide, ceramic aluminum oxide, heated treated aluminum oxide, silicon carbide, boron carbide, alumina zirconia, iron oxide, ceria, garnet, and combinations thereof. In one embodiment, the abrasive particles may include or consist essentially of diamond. Diamond abrasive particles may be natural or synthetically made diamond. The diamond particles may have a blocky shape with distinct facets associated with them or, alternatively, an irregular shape. The diamond particles may be monocrystalline or polycrystalline such as diamond commercially available under the trade designation "Mypolex" from Mypodiamond Inc., Smithfield Pa. Monocrystalline diamond of various particles size may be obtained from Diamond Innovations, Worthington, Ohio. Polycrystalline diamond may be obtained from Tomei Corporation of America, Cedar Park, Tex. The diamond particles may contain a surface coating such as a metal coating (nickel, aluminum, copper or the like), an inorganic coating (for example, silica), or an organic coating.

In some embodiments, the abrasive particles may include a blend of abrasive particles. For example, diamond abrasive particles may be mixed with a second, softer type of abrasive particles. In such instance, the second abrasive particles may have a smaller average particle size than the diamond abrasive particles.

In illustrative embodiments, the abrasive particles may be uniformly (or substantially uniformly) distributed throughout the ceramic matrix. As used herein, "uniformly distributed" means that the unit average density of abrasive particles in a first portion of the composite particle does not vary by more than 20%, more than 15%, more than 10%, or more than 5% when compared with any second, different portion of the composite particle. This is in contrast to, for example, an abrasive composite particle having abrasive particles concentrated at the surface of the particle.

In various embodiments, the abrasive composite particles of the present disclosure may also include optional additives such as fillers, coupling agents, surfactants, foam suppressors and the like. The amounts of these materials may be selected to provide desired properties. Additionally, the abrasive composite particles may include (or have adhered to an outer surface thereof) one or more parting agents. As will be discussed in further detail below, one or more parting agents may used in the manufacture of the abrasive composite particles to prevent aggregation of the particles. Useful parting agents may include, for example, metal oxides (e.g., aluminum oxide), metal nitrides (e.g., silicon nitride), graphite, and combinations thereof.

In some embodiments, the abrasive composites useful in the articles and methods of the present disclosure may have an average size (average major axial diameter or longest straight line between two points on a composite) of about at least 5 µm, at least 10 µm, at least 15 µm, or at least 20 µm; less than 1,000 µm, less than 500 µm, less than 200 µm, or less than 100 µm.

In illustrative embodiments, the average size of the abrasive composites is at least about 3 times the average size of the abrasive particles used in the composites, at least about 5 times the average size of the abrasive particles used in the composites, or at least about 10 times the average size of the abrasive particles used in the composites; less than 30 times the average size of the abrasive particles used in the composites, less than 20 times the average size of the abrasive particles used in the composites, or less than 10 times the average size of the abrasive particles used in the composites. Abrasive particles useful in the articles and methods of the present disclosure may have an average particle size (average major axial diameter (or longest straight line between two points on a particle)) of at least about 0.5 µm, at least about 1 µm, or at least about 3 µm; less than about 300 µm, less than about 100 µm, or less than about 50 µm. The abrasive particle size may be selected to, for example, provide a desired cut rate and/or desired surface roughness on a workpiece. The abrasive particles may have a Mohs hardness of at least 8, at least 9, or at least 10.

In various embodiments, the weight of abrasive particles to the weight of glassy ceramic material in the ceramic matrix of the ceramic abrasive composites is at least about 1/20, at least about 1/10, at least about 1/6, at least about 1/3, less than about 30/1, less than about 20/1, less than about 15/1 or less than about 10/1.

Figure 7:
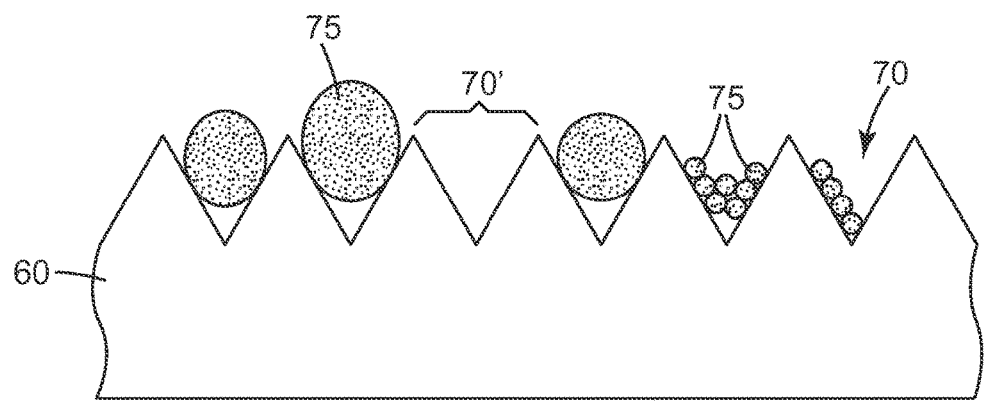
FIG. 7 illustrates a schematic cross-sectional view of a polishing pad having a plurality of cavities with one or more abrasive composite particles at least partially disposed therein in accordance with some embodiments of the present disclosure.

Referring now to FIG. 7, in various embodiments, the abrasive composites of the present disclosure may be sized and shaped relative to the size and shape of the cavities 70 of the polishing pad 40 such that one or more (up to all) of the abrasive composites may be at least partially disposed within a cavity 70. More specifically, as shown in FIG. 7, the abrasive composites 75 may be sized and shaped relative to the cavities 70 such that one or more (up to all) of the abrasive composites 75, when fully received by a cavity 70, has at least a portion that extends beyond the cavity opening 70'. As used herein, the phrase "fully received," as it relates to the position of a composite within a cavity, refers to the deepest position the composite may achieve within a cavity upon application of a non-destructive compressive force (such as that which is present during a polishing operation, as discussed below). In this manner, as will be discussed in further detail below, during a polishing operation, the abrasive composite particles of the polishing solution may be received in and retained by (e.g., via frictional forces) the cavities 70, thereby functioning as an abrasive working surface.

In various embodiments, the amount of porous ceramic matrix in the ceramic abrasive composites is at least 5, at least 10, at least 15, at least 33, less than 95, less than 90, less than 80, or less than 70 weight percent of the total weight of the porous ceramic matrix and the individual abrasive particles, where the ceramic matrix includes any fillers, adhered parting agent and/or other additives other than the abrasive particles In various embodiments, the abrasive composite particles may be precisely-shaped or irregularly shaped (i.e., non-precisely-shaped). Precisely-shaped ceramic abrasive composites may be any shape (e.g., cubic, block-like, cylindrical, prismatic, pyramidal, truncated pyramidal, conical, truncated conical, spherical, hemispherical, cross, or post-like). The abrasive composite particles may be a mixture of different abrasive composite shapes and/or sizes. Alternatively, the abrasive composite particles may have the same (or substantially the same) shape and/or size. Non-precisely shaped particles include spheroids, which may be formed from, for example, a spray drying process.

In various embodiments, the concentration of the abrasive composites in the fluid component may be at least 0.065 wt. %, at least 0.16 wt. %, at least 0.33 or at least 0.65 wt. %; less than 6.5 wt. %, less than 4.6 wt. %, less than 3.0 wt. % or less than 2.0 wt %. In some embodiments, both the ceramic abrasive composites and the parting agent used in their fabrication can be included in the fluid component. In these embodiments the concentration of the abrasive composites and the parting agent in the fluid component may be at least 0.1 wt. %, at least 0.25 wt. %, at least 0.5 or at least 1.0 wt. %; less than 10 wt. %, less than 7 wt. %, less than 5 wt. % or less than 3 wt.

The abrasive composite particles of the present disclosure may be formed by any particle forming processes including, for example, casting, replication, microreplication, molding, spraying, spray-drying, atomizing, coating, plating, depositing, heating, curing, cooling, solidification, compressing, compacting, extrusion, sintering, braising, atomization, infiltration, impregnation, vacuumization, blasting, breaking (depending on the choice of the matrix material) or any other available method. The composites may be formed as a larger article and then broken into smaller pieces, as for example, by crushing or by breaking along score lines within the larger article. If the composites are formed initially as a larger body, it may be desirable to select for use fragments within a narrower size range by one of the methods known to those familiar with the art. In some embodiments, the ceramic abrasive composites may include vitreous bonded diamond agglomerates produced generally using the method of U.S. Pat. Nos. 6,551,366 and 6,319,108, which is herein incorporated by reference in its entirety.

Generally, a method for making the ceramic abrasive composite includes mixing an organic binder, solvent, abrasive particles, e.g., diamond, and ceramic matrix precursor particles, e.g., glass frit; spray drying the mixture at elevated temperatures producing "green" abrasive/ceramic matrix/binder particles; the "green" abrasive/ceramic matrix/binder particles are collected and mixed with a parting agent, e.g., plated white alumina; the powder mixture is then annealed at a temperature sufficient to vitrify the ceramic matrix material that contains the abrasive particles while removing the binder through combustion; forming the ceramic abrasive composite. The ceramic abrasive composites can optionally be sieved to the desired particle size. The parting agent prevents the "green" abrasive/ceramic matrix/binder particles from aggregating together during the vitrifying process. This enables the vitrified, ceramic abrasive composites to maintain a similar size as that of the "green" abrasive/ceramic matrix/binder particles formed directly out of the spray drier. A small weight fraction, less than 10%, less 5% or even less than 1% of the parting agent may adhere to the outer surface of the ceramic matrix during the vitrifying process. The parting agent typically has a softening point (for glass materials and the like), or melting point (for crystalline materials and the like), or decomposition temperature, greater than the softening point of the ceramic matrix, wherein it is understood that not all materials have each of a melting point, a softening point, or a decomposition temperature. For a material that does have two or more of a melting point, a softening point, or a decomposition temperature, it is understood that the lower of the melting point, softening point, or decomposition temperature is greater than the softening point of the ceramic matrix. Examples of useful parting agents include, but are not limited to, metal oxides (e.g. aluminum oxide), metal nitrides (e.g. silicon nitride) and graphite.

In some embodiments, the abrasive composite particles of the present disclosure may be surface modified (e.g., covalently, ionically, or mechanically) with reagents which will impart properties beneficial to abrasive slurries. For example, surfaces of glass can be etched with acids or bases to create appropriate surface pH. Covalently modified surfaces can be created by reacting the particles with a surface treatment comprising one or more surface treatment agents. Examples of suitable surface treatment agents include silanes, titanates, zirconates, organophosphates, and organosulfonates. Examples of silane surface treatment agents suitable for this invention include octyltriethoxysilane, vinyl silanes (e.g., vinyltrimethoxysilane and vinyl triethoxysilane), tetramethyl chloro silane, methyltrimethoxysilane, methyltriethoxysilane, propyltrimethoxysilane, propyltriethoxysilane, tris[3-(trimethoxysilyl)propyl] isocyanurate, vinyl-tris-(2-methoxyethoxy)silane, gamm-methacryloxypropyltrimethoxysilane, beta-(3,4-epoxycyclohexyl)ethyltrimethoxysilane, gamma-glycidoxypropyltrimethoxysilane gamma-mercaptopropyltrimethoxysilane, gamma-aminopropyltriethoxysilane, gamma-aminopropyltrimethoxysilane, N-beta-(aminoethyl)-gamma-aminopropyltrimethoxysilane, bis-(gamma-trimethoxysilylpropyl)amine, N-phenyl-gamma-aminopropyltrimethoxysilane, gamma-ureidopropyltrialkoxysilane, gamma-ureidopropyltrimethoxysilane, acryloxyalkyl trimethoxysilane, methacryloxyalkyl trimethoxysilane, phenyl trichlorosilane, phenyltrimethoxysilane, phenyl triethoxysilane, SILQUEST A1230 proprietary non-ionic silane dispersing agent (available from Momentive, Columbus, Ohio) and mixtures thereof. Examples of commercially available surface treatment agents include SILQUEST A174 and SILQUEST A1230 (available from Momentive). The surface treatment agents may be used to adjust the hydrophobic or hydrophilic nature of the surface it is modifying. Vinyl silanes can be used to provide an even more sophisticated surface modification by reacting the vinyl group w/ another reagent. Reactive or inert metals can be combined with the glass diamond particles to chemically or physically change the surface. Sputtering, vacuum evaporation, chemical vapor deposition (CVD) or molten metal techniques can be used.

In some embodiments, the present disclosure further relates to a second polishing solution, or finishing polishing solution, which, as will be discussed in further detail below, is intended for use during a final stage of a polishing operation. The second polishing solution may include any of the above-described polishing solutions, and may include an abrasive particle concentration that is 30%, 40%, 50%, 60%, 70%, 80%, 90% or 100% less than the first polishing solution (i.e., be substantially free of abrasive material). In various embodiments, the fluid component of the second polishing solution is the same as or substantially the same as the fluid component of the first polishing solution.

The present disclosure further relates to methods of polishing substrates. The methods may be carried out using a polishing system such as that described with respect to FIG. 1, or with any other conventional polishing system, e.g. single or double sided polishing and lapping. In some embodiments, a method of polishing substrate may include providing a substrate to be polished. The substrate may be any substrate for which polishing and/or planarization is desirable. For example, the substrate may be a metal, metal alloy, metal oxide, ceramic, or polymer (commonly in the form of a semiconductor wafer or optical lens). In some embodiments, the methods of the present disclosure may be particularly useful for polishing ultrahard substrates such as sapphire (A, R, or C planes), silicon, silicon carbide, quartz, or silicate glasses. The substrate may have one or more surfaces to be polished.

In various embodiments, the method may further include providing a polishing pad and a polishing solution. The polishing pad and polishing solution may be the same as or similar to any of the polishing pads and the polishing solutions described above.

In some embodiments, the method may further include contacting a surface of the substrate with the polishing pad and the polishing solution while there is relative motion between the polishing pad and the substrate. For example, referring again to the polishing system of FIG. 1, the carrier assembly 30 may apply pressure to the substrate 12 against a polishing surface of the polishing pad 40 (which may be coupled to the platen 20) in the presence of the polishing solution 50 as the platen 20 is moved (e.g., translated and/or rotated) relative to the carrier assembly 30. Additionally, the carrier assembly 30 may be moved (e.g., translated and/or rotated) relative to the platen 20. As a result of the pressure and relative motion, the abrasive particles (which may be contained in/on the polishing pad 40 and/or the polishing solution 50) may remove material from the surface of the substrate 12. During the polishing method, abrasive particle, e.g. ceramic abrasive composites, may be embedded in the second major surface of the polishing pad, wherein the abrasive particle are located in regions of the second major surface coincident with the load bearing area of the cavity walls. In these embodiments, an abrasive pad is formed in-situ and corresponding systems; including a polishing system comprising abrasive pad and polishing solution, a polishing system comprising abrasive pad and substrate to be polished and a polishing system comprising abrasive pad, polishing solution and substrate to be polished; are produced and considered to be embodiments of the present invention. The load bearing area of the cavity walls may represent less than 70%, less than 60%, less than 50%, less than 40%, less than 20% less than 15%, less than 10% or even less than 5% of the of the total area of the first major surface 65 of base layer 60 (see FIGS. 6a and 6B).

In embodiments in which the polishing pad comprises a major surface that includes cavities and an opposite major surface that is continuous or nearly continuous, the polishing pad may be coupled to the platen such that the cavity-containing major surfaces of the pad or pad layers will function as the polishing/working surface (i.e., the cavity containing major surface of the pad or pad layer is positioned further from the platen than the continuous or nearly continuous surface of such pad or pad layer). Alternatively, the polishing pad may be coupled to the platen such that the continuous or nearly continuous major surface of the pad or pad layers will function as the polishing/working surface (i.e., the continuous or nearly continuous major surface of the pad or pad layer is positioned further from the platen than the cavity containing surface of such pad or pad layer).

In embodiments in which the polishing/working surface of the polishing pad includes cavities, as a result of the pressure and relative motion, at least some (up to all) of the abrasive composite particles of the polishing solution 50 may be transported into and retained within a cavity 70 of the polishing pad to form an abrasive working surface. Continued pressure and relative motion between the substrate and the polishing surface may then result in polishing of the substrate.

In some embodiments, after the polishing method has been carried out for a desired period, the methods of the present disclosure may further include adjusting either or both of a flow rate at which the slurry is provided to the polishing system and the composition of the polishing solution (i.e., providing a second polishing) such that the amount of abrasive particles that are available for polishing may be reduced during a final stage of polishing. For example, the flow rate of the slurry may be reduced by 30%, 40%, 50%, 60%, 70%, 80%, 90% or 100% relative to an initial rate of the first polishing solution. As an additional example, a second polishing solution may be provided as the polishing solution, the second polishing solution having an abrasive particle concentration that is 30%, 40%, 50%, 60%, 70%, 80%, 90% or 100% less than the first polishing solution (i.e., be substantially free of abrasive material). In some embodiments, the second polishing solution may have an abrasive particle concentration of less than 0.5 wt. %, less than 0.3 wt. % or less than 0.1% wt. %. In these embodiments, when the polishing solution is reduced or when the abrasive particle concentration is reduced, abrasive particle, e.g. ceramic abrasive composites, may be embedded in the second major surface of the polishing pad, wherein the embedded abrasive particles are located in regions of the second major surface coincident with the load bearing area of the cavity walls. In cases where the flow rate of the first polishing solution, e.g. slurry, is reduced to substantially zero or the concentration of abrasive particles in the second polishing solution is substantially zero, an abrasive article having abrasive particles, e.g. ceramic abrasive composites, embedded in the second major surface of the polishing pad, wherein the embedded abrasive particles are located in regions of the second major surface coincident with the load bearing area of the cavity walls, may still be formed from ceramic abrasive composites remaining on the pad from the first polishing solution.

In embodiments in which the polishing pad is a multi-layered polishing pad arrangement, after the polishing method has been carried out for a period, the methods of the present disclosure may further include removing the working polishing pad layer (i.e., the polishing pad layer that is nearest the substrate/furthest from the platen) from the multi-layered arrangement, thereby exposing the top surface of the adjacent polishing pad layer in the arrangement. The method may then include carrying out further polishing operations with such second working polishing pad layer. This process may then be repeated until each polishing pad layer of the multi-layered arrangement has expired (i.e., has reached the conclusion of its useful life), or has been removed as desired.

In illustrative embodiments, the systems and methods of the present disclosure are particularly suited for the finishing of ultra hard substrates such as sapphire, A, R, or C planes. Finished sapphire crystals, sheets or wafers are useful, for example, in the light emitting diode industry and cover layer for mobile hand held devices. In such applications, the systems and methods provide persistent removal of material. Furthermore, it has been discovered that systems and methods of the present disclosure can provide a removal rate commensurate with that achieved with large abrasive particle sizes conventionally employed, while providing a surface finish comparable to that achieved with small particle sizes conventionally employed. Still further, the systems and methods of the present disclosure are capable of providing persistent removal rates without extensive dressing of the pad, such as required with fixed abrasive pads.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

| MATERIALS | |
|---|---|
| Materials | |
| Abbreviation or Trade Name | Description |
| MCD3A | A 3 micron monocrystalline diamond, available from Diamond Innovations. |
| MCD3B | A 3 micron monocrystalline diamond, available from World Wide Super Abrasives, Boynton Beach, Florida. |
| GF* | A glass frit having a particle size of about 10.6 microns, available under the trade designation "SP 1086" from Specialty Glass, Inc., Oldsmar, Florida. |
| AlOx | A 3 micron plated white alumina, available under the trade designation "PWA 3" from Fujimi Inc., Kiyosu, Japan. |
| Standex230 | Dextrin, available under the trade designation "STANDEX 230" from A. E. Staley Manufacturing Company, Decatur, Illinois. |

-continued

MATERIALS
Materials

| Abbreviation or Trade Name | Description |
| --- | --- |
| EG | Anhydrous ethylene glycol, available from Sigma-Aldrich Co. LLC, St. Louis, Missouri. |
| TEG | Triethylene glycol, 99%, available from Sigma-Aldrich Co. LLC. |

*Particle size is the mean measured by conventional laser light scattering.

Test Methods and Preparation Procedures
Removal Rate Test Method 1

Sapphire wafers were measured gravimetrically before and after polishing. The measured weight loss was used to determine the amount of material removed, based on a wafer density of 3.98 g/cm$^3$. For single sided polishing (Example 4), removal rate, reported in microns/minute, is the average thickness reduction of the three wafers over the specified polishing interval. For double sided polishing (Examples 5 and 6), removal rate, reported in microns/minute, is the average thickness reduction of the three wafers over the specified polishing interval.

Surface Roughness Test Method 1:

Surface roughness measurements; including Ra, Rmax, and Rz; were made using a contact stylus profilometer, Model P-16+ available from KLA-Tencor Corporation, Milpitas, Calif. The scan rate was 100 microns/sec and the scan length was 2500 microns. For single sided polishing (Example 4), three profilometer scans were conducted on each of the three wafers and the data was averaged. For double sided polishing (Examples 5 and 6), ten profilometer scans were conducted on one of the nine wafers and the data of the ten scans was averaged.

Polishing Test-1

Polishing was conducted using a LAPMASTER Model 15 polisher, available from Lapmaster International, Prospect Ill. A 14 inch (35.6 cm) diameter pad was mounted to the 14 inch (35.6 cm) diameter platen of the polisher using a double sided PSA. The platen was rotated at 50 rpm. The head of the polisher was rotated at 40 rpm, without a sweeping motion. A carrier comprising three, equilateral, triangular shaped recesses, each sized to hold a 5.1 cm diameter wafer, was mounted to the head. The recess center points were located equal distance from each other and were offset relative to the center of the head, such that when the head rotated, the center point of each triangular shaped recess would rotate in a circle having a 13.5 cm circumference. Three, C-plane sapphire wafers, 5.1 cm diameter×0.5 cm thick, were mounted in the carrier recesses and polished. Polishing time was 30 minutes. The load was applied to the wafers using weights of 37.7 lbs (17.1 kg) to achieve polishing pressure of 4 psi. The slurry flow rate was 1 g/min and sprayed onto the pad at a point about 4 cm from the pad center. Wafers were measured gravimetrically before and after polishing. The measured weight loss was used to determine the amount of material removed, based on a wafer density of 3.98 g/cm$^3$. Removal rate, reported in microns/minute, is the average thickness reduction of the three wafers over the 30 minute polishing interval. Wafers were re-used for each 30 minute period.

Preparation of Ceramic Abrasive Composite (CAC-1)

Ceramic abrasive composites were prepared from an aqueous dispersion, using a spray drying technique, as follows. Standex230, 49 g, was added to 1,100 g of deionized water and stirred continuously. After 10 minutes, 720 g of GF, was added over a 1 minute time interval. Note that the GF was ground down to a particle size of about 4.2 microns, prior to use. 880 g of MCD3A was then added to the solution with continual stirring. The solution was then atomized in a centrifugal atomizer, a MOBILE MINER 2000 from GEA Process Engineering A/S, Søborg, Denmark. The atomization wheel was running at 20,000 rpm. Air was supplied at 200° C. into the atomization chamber and was used to dry the droplets as they formed, producing spray dried, ceramic abrasive composites. The collected composites were then combined with AlOx, forming a 65/35 composite/AlOx (wt./wt.) powder blend. The powder blend was vitrified at 750° C. for 1 hr. After cooling, the vitrified, ceramic abrasive composites were passed through a conventional sieve having openings of about 63 microns. The collected vitrified, ceramic abrasive composites, having a particle size of about 63 microns and less were designated as CAC-1

Preparation of Ceramic Abrasive Composite (CAC-2)

CAC-2 was prepared similarly to CAC-1, except MCD3A was replaced by MCD3B. The collected vitrified, ceramic abrasive composites, having a particle size of about 63 microns and less were designated as CAC-2.

Preparation of Ceramic Abrasive Composite (CAC-3)

CAC-3 was prepared similarly to CAC-2, except, after cooling, the vitrified, ceramic abrasive composites were passed through a conventional sieve having openings of about 38 microns and a second sieve having openings of about 20 microns. Use of the 20 micron sieve allowed the removal of the loose AlOx particles. The collected, vitrified ceramic abrasive composites having a size range between about 20 microns and 38 microns were designated CAC-3.

Preparation of Ceramic Abrasive Composite (CAC-4)

CAC-4 was prepared similarly to CAC-2, except the GF was not milled and used as received (about a 10.6 micron particle size). The collected, vitrified, ceramic abrasive composites, having a particle size of about 63 microns and less were designated as CAC-4.

Preparation of Slurry-1

A slurry was prepared by forming a non-aqueous solution containing 10 g CAC-1 and 1,000 g EG. The solution was mixed using a conventional high shear mixer for about 30 minutes prior to use.

Preparation of Slurry-2

Slurry-2 was prepared by forming a non-aqueous solution containing 10 g CAC-2 and 990 g TEG. The solution was mixed using a conventional high shear mixer for about 30 minutes prior to use.

Preparation of Slurry-3

Slurry-3 was prepared by forming a non-aqueous solution containing 10 g CAC-3 and 990 g TEG. The solution was mixed using a conventional high shear mixer for about 30 minutes prior to use.

Preparation of Slurry-4

Slurry-4 was prepared by forming a non-aqueous solution containing 10 g CAC-4 and 990 g TEG. The solution was mixed using a conventional high shear mixer for about 30 minutes prior to use.

Single Layer Pad-1

A single layer polishing pad having a plurality of cavities was prepared. The pad consisted of a sheet 28 inches (71.1 cm) wide by 28 inches long (71.1 cm) of polypropylene with a hexagonal array of hexagonal features. The center to center distance between features was about 4.829 mm. The six interior sidewalls forming the individual hexagonal features had a length of about 1.981 mm, a width of about 1.183 mm and a depth (cavity depth) of about 0.762 mm. At their base, the walls were about 1.397 mm and tapered to about 1.183 mm, at their distal end. The sidewalls had a total bearing area of about 43%. The hexagonal features of the polypropylene sheet were formed by an embossing process, wherein the texture from a metal master tool, having the inverse texture of the desired polypropylene sheet, was formed into the polypropylene. The square array of the master tool was made by a conventional CNC machining process of a metal. Embossing of the polypropylene sheet via the master tool was conducted near the melting temperature of the polypropylene following conventional embossing techniques. On the back side of the sheet (the side opposite the hexagonal cavities), after the embossing and during the cooling of the sheet, a dimple was formed in the hexagonal region of each feature, the dimple had a maximum depth of about 0.084 mm. A sheet of double coated polyester tape, available under the trade designation 442DL from 3M Company, was laminated to the cavity side of the polypropylene sheet. Several pads were made according to this procedure, die cut to the appropriate size and used in the polishing processes of Examples 4-6.

Example 1

A multi-layer pad (2 layers), having a solvent soluble adhesive between layers, was prepared according to the following procedure. The two polishing layers of the pad were fabricated from textured polypropylene sheets. The texture was a series of cavities that consisted of inverse truncated square pyramids having a square shaped opening, the length of an edge of the square being 380 microns, and a depth of 355 microns. At the 355 micron depth, the length of an edge of the square shaped truncated pyramid top was 314 microns. The square pyramids were positioned in a horizontal-vertical grid array with a pitch of 594 microns. The textured polypropylene sheet was formed by an embossing process, wherein the texture from a metal master tool, having the inverse texture of the desired polypropylene sheet, was formed into the polypropylene. The square array of the master tool was made by a conventional diamond turning process of a metal. Embossing of the polypropylene sheet via the master tool was conducted near the melting temperature of the polypropylene following conventional embossing techniques.

The non-textured side of the first polypropylene sheet (pad layer 1) was sprayed with 3M SUPER 77 Multipurpose Adhesive, available from 3M Company, St. Paul, Minn. After spraying, the adhesive side of pad layer 1 was machine laminated to the texture side of the second polypropylene sheet (pad layer 2) using a Model XRL 360 hot roll laminator, available from Western Magnum Corporation, EL Segundo, Calif. The hot rolls were run at room temperature, light pressure, about 20 psi, was applied to the rolls and the speed setting of the laminator was set at 2. The non-textured side of the second polypropylene sheet was then laminated to a first major surface of a subpad via a double coated adhesive tape attached to the subpad surface, with the same laminator using the same process conditions. The subpad was a 20 mil (0.51 mm) thick polycarbonate sheet with a double coated polyester tape laminated to both major surfaces. The tape is available under the trade designation 442DL from 3M Company. The complete stack of the polypropylene sheets and the subpad was die cut into a circle having a 14 inch (35.6 cm) diameter, producing Example 1.

Using Polishing Test-1, Slurry-1 and the pad of Example 1, a series of sapphire wafers were polished using the textured surface of polishing layer 1 of Example 1. After 120 minutes of polishing, pad layer 1 of Example 1 was removed from the multi-layer pad by peeling from pad layer 2, by hand. Polishing was then continued for 120 additional minutes on the textured surface of pad layer 2 of Example 1. Removal rate (RR) data is shown in Table 1.

TABLE 1

| | Polishing Time (minutes) | | | | | | | |
|---|---|---|---|---|---|---|---|---|
| | 30 | 60 | 90 | 120 | 150 | 180 | 210 | 240 |
| RR (µm/minute) | 1.01 | 1.21 | 1.16 | 1.25 | 1.14 | 1.01 | 1.10 | 1.17 |

Example 2

A multi-layer pad (2 layers), laminated together by a differential adhesive tape, i.e. a tape having adhesive with differing levels of tack on each of its major surfaces, was prepared according to the following procedure. Two sheets, 61 cm×61 cm, of polycarbonate having a thickness of 0.051 cm, available as LEXAN FILM from Sabic Innovative Plastics Holding, Schiller Park, Ill., were laminated together using adhesive tape-1 and the laminator and process conditions described in Example 1. Adhesive tape-1 was prepared by spraying a thin layer of 3M SUPER 77 Multipurpose Adhesive on a first major surface of a 3 mil (0.076 mm) PET liner, create a high tack adhesive side, and spraying a thin layer of 3m SPRAY MOUNT Artist's Adhesive, available from 3M Company, on the other major surface of the liner, creating a low tack adhesive side. During the actual pad fabrication process, the PET liner was first sprayed with 3M SUPER 77 Multipurpose Adhesive and then the first polycarbonate sheet (pad layer 1) was machine laminated to the PET liner via the multipurpose adhesive. The uncoated exposed surface of the PET liner was then sprayed with SPRAY MOUNT Artist's Adhesive and the second polycarbonate sheet (pad layer 2) was then machine laminated to the PET liner via the artist's adhesive. The exposed surface of pad layer 2 was then laminated to a subpad, as described in Example 1. The complete stack of the polycarbonate sheets and the subpad was die cut into a circle having a 14 inch (35.6 cm) diameter, producing Example 2.

Using Polishing Test-1, Slurry-1 and the pad of Example 2, a series of sapphire wafers were polished using the surface of polishing layer 1 of Example 2. After 120 minutes of polishing, pad layer 1 of Example 2 was removed from the multi-layer pad by peeling from pad layer 2, by hand. Polishing was then continued for 120 additional minutes on the surface of pad layer 2 of Example 2. Removal rate (RR) data is shown in Table 2.

TABLE 2

| | Polishing Time (minutes) | | | | | | | |
|---|---|---|---|---|---|---|---|---|
| | 30 | 60 | 90 | 120 | 150 | 180 | 210 | 240 |
| RR (µm/minute) | 0.87 | 1.05 | 1.00 | 1.06 | 1.10 | 1.12 | 1.00 | 1.05 |

Example 3

A multi-layer pad (2 layers), wherein the second pad layer has a low energy surface to facilitate removal from the first pad layer, was prepared according to the following procedure. The two polishing layers of the pad were fabricated from two, 20 inch (50.8 cm)×20 inch (50.8 cm)×12 mil (0.305 mm) thick polyurethane films, having a 2 mil (0.051 mm) thick adhesive coated on one of the major surfaces, available under the trade designation Paint Protection Film PUL2012, 14 mil, from 3M Company. One film, designated pad layer 1 was used as received. The polyurethane side (non-adhesive side) of the second film, designated pad layer 2, was coated with a thin layer of SPRAYON MR 307 Heavy-Duty Paintable Release Agent, available from Sprayon, Cleveland, Ohio, creating a low energy surface on the polyurethane film surface. The adhesive side of the pad layer 1 was then laminated to the low energy surface side of pad layer 2, using the laminator and process conditions described in Example 1. The adhesive surface of pad layer 2 was then laminated to a subpad, as described in Example 1. The complete stack of the polyurethane films and the subpad was die cut into a circle having a 14 inch (35.6 cm) diameter, producing Example 3.

Using Polishing Test-1, Slurry-1 and the pad of Example 3, a series of sapphire wafers were polished using the surface of pad layer 1 of Example 3. After 120 minutes of polishing, pad layer 1 of Example 3 was removed from the multi-layer pad by peeling from pad layer 2, by hand. Polishing was then continued for 120 additional minutes on the surface of pad layer 2 of Example 3. Removal rate (RR) data is shown in Table 3. Note, prior to polishing, pad layer 1 was conditioned for 10 minutes using 600 grit finishing stones, 600 CS-M, available from BORIDE Engineered Abrasives, Traverse City, Mo. Six finishing stones, which were cut into strips about 2 inch (5.1 cm)×about 0.5 inch (1.3 cm)×about 0.25 inch (0.64 cm), were mounted around the periphery of a stainless steel ring having about a 6 inch (15.2 cm) outside diameter. The ring was placed on the pad, with the stones in contact with the pad surface, and about 7 kg of weight was set on top of the ring. The platen was rotated at 50 rpm and the ring was rotated at 40 rpm, during the conditioning process. Prior to polishing, pad layer 2 was conditioned for 20 minutes using the same conditioning procedure used for pad layer 1.

TABLE 3

| | Polishing Time (minutes) | | | | | | | |
|---|---|---|---|---|---|---|---|---|
| | 30 | 60 | 90 | 120 | 150 | 180 | 210 | 240 |
| RR (μm/minute) | 0.40 | 0.39 | 0.33 | 0.39 | 0.32 | 0.34 | 0.32 | 0.30 |

Example 4

A multi-step polishing process was conducted as follows. A single sided polisher, a model 15FL-100V available from Engis Corporation, Wheeling, Ill., was used to polish three, 50 mm diameter, A-plane sapphire wafers, available from Rubicon Technology, Inc., Franklin Park, Ill. The wafers were set into a weighted carrier. The total carrier weight was 42 lbs (19 kg), which provides a down force of 4.46 psi. The three wafers were equally spaced on the holder, such that, when the carrier was rotated, the wafers swept through a diameter that covered 4.5 inches (11.4 cm) of the pad. A pad, Single Layer Pad-1, which had been cut to a diameter of 38 cm, was mounted to the platen of the polisher via the 442DL adhesive. The polishing cycle was 30 minutes long with a platen rotational speed of 50 rpm, while the wafers rotated at 40 rpm. The polishing process had two steps. The first step used Slurry-2, which was dripped on the polishing pad at a rate of 1 gram/min and applied at a point 3 inches (7.6 cm) from the center of the platen, using peristaltic pump. The slurry was continually mixed, prior to being pumped on the pad. After 20 minutes of polishing, the wafers were removed from the carrier and the removal rate and surface finish were measured via Removal Rate Test Method 1 and Surface Roughness Test Method 1. The wafers were remounted to the carrier and a second step polish was conducted. During the second step polish, the slurry flow is stopped, allowing only the already deposited diamond from the first polishing step to provide additional removal and improved surface finish. The second polishing step, without any additional slurry being pumped to the pad, is conducted for 10 minutes. Using Removal Rate Test Method 1 and Surface Roughness Test Method 1, the removal rate and surface roughness of the sapphire wafers was determined after the second step polish. Results are shown below, Table 3, and indicate that the surface finished improved significantly after the second polishing step, when polishing was conducted without additional slurry being applied to the pad.

TABLE 3

| | Removal Rate (μm/min) | Ra (nm) | Rz (nm) | Rmax (nm) |
|---|---|---|---|---|
| Measurements taken after polishing step 1. | 1.16 | 33 | 402 | 571 |
| Measurements taken after polishing step 2. | 0.2 | 22 | 395 | 395 |

Example 5

A multi-step polishing process was conducted as follows. A double sided polisher, model AC500 available from Peter-Wolters, GmbH, Rendsburg, Germany, was used to polish nine, 50 mm diameter, A-plane sapphire wafers, available from Rubicon Technology, Inc. The nine wafers were mounted in three epoxy-glass carries, each carrier holding three wafers. The down force on the wafers was 52 daN. A first pad, Single Layer Pad-1, which had been cut to have an outer diameter of 28.25 inches (71.8 cm) and an additional 7 inch (17.8 cm) diameter hole cut from the center and mounted to the bottom platen of the polisher via the 442DL adhesive. A second pad, Single Layer Pad-1, having the same dimensions with an additional sixteen, 1 cm diameter holes cut into it was mounted to the upper platen of the tool. The sixteen holes coincided with the holes in the platen for slurry delivery. During polishing the platen rotational speeds of were 60 rpm, with both platens rotating clockwise. The polishing liquid, corresponding flow rate, down force on the platens and polishing time is shown in Table 4.

TABLE 4

| | Time (min) | Polishing Liquid | Flow Rate (g/min) | Down force (daN) |
|---|---|---|---|---|
| Pre-wet | 0 to ⅙ | Slurry-3* | 6 | 20 |
| Polish Step 1 | ⅙ to 30⅙ | Slurry-3* | 6 | 51 |
| Rinse | 30⅙ to 30⅔ | TEG | 2200 | 51 |
| Polish Step 2 | 30⅔ to 40⅔ | TEG* | 6 | 51 |

*Delivered to the pads using a peristaltic pump.

Using Removal Rate Test Method 1 and Surface Roughness Test Method 1, the removal rate and surface roughness of the sapphire wafers was determined after the first and second step polish. Results are shown in Table 5 and indicate that the surface finished improved significantly in the second polishing step, when polishing was conducted with only solvent being applied to the pad (no ceramic abrasive composites).

TABLE 5

| | Wafer Surface | Removal Rate (μm/min) | Ra (nm) | Rz (nm) | Rmax (nm) |
|---|---|---|---|---|---|
| Measurements taken after polishing step 1. | Top | 2.0 | 29 | 330 | 660 |
| Measurements taken after polishing step 1. | Bottom | | 36 | 360 | 500 |
| Measurements taken after polishing step 2. | Top | 0.4 | 14 | 161 | 260 |
| Measurements taken after polishing step 2. | Bottom | | 22 | 265 | 380 |

Example 6

A multistep polishing process was conducted similar to Example 5, except the polishing liquid, corresponding flow rate, down force on the platens and polishing time was as shown in Table 6.

TABLE 6

| | Time (min) | Polishing Liquid | Flow Rate (g/min) | Down force (daN) |
|---|---|---|---|---|
| Pre-wet | 0 to ⅙ | Slurry-3* | 6 | 20 |
| Polish Step 1 | ⅙ to 30⅙ | Slurry-3* | 6 | 51 |
| Rinse | 30⅙ to 30⅔ | TEG | 2200 | 51 |
| Polish Step 2 | 30⅔ to 40⅔ | TEG* | 6 | 51 |
| Polish Step 3 | 40⅔ to 50⅔ | TEG* | 6 | 51 |

*Delivered to the pads using a peristaltic pump.

Results are shown in Table 7 and indicate that the surface finished improved significantly in the second and third polishing step, when polishing was conducted with only solvent being applied to the pad (no ceramic abrasive composites).

TABLE 7

| | Wafer Surface | Removal Rate (μm/min) | Ra (nm) | Rz (nm) | Rmax (nm) |
|---|---|---|---|---|---|
| Measurements taken after polishing step 1. | Top | 1.1 | 26 | 270 | 350 |
| Measurements taken after polishing step 1. | Bottom | | 30 | 345 | 1140 |
| Measurements taken after polishing step 2. | Top | 0.4 | 12 | 184 | 332 |
| Measurements taken after polishing step 2. | Bottom | | 12 | 163 | 310 |
| Measurements taken after polishing step 3. | Top | 0.2 | 7 | 144 | 735 |
| Measurements taken after polishing step 3. | Bottom | | 7 | 123 | 207 |

Other embodiments of the invention are within the scope of the appended claims.

What is claimed is:

1. A system for polishing a substrate: the system comprising:
a carrier assembly configured to receive and holding a substrate;
a polishing pad comprising:
a base layer having a first major surface and a second major surface opposite the first major surface, wherein the first major surface includes a plurality of cavities that extend into the base layer from the first major surface; and
a platen, wherein the polishing pad is coupled to the platen such that the second major surface is the working surface; and
a polishing solution disposed between the polishing pad and the substrate, wherein the polishing solution comprises:
a fluid component, and
ceramic abrasive composites, wherein the ceramic abrasive composites comprise individual abrasive particles dispersed in a porous ceramic matrix, and wherein the ceramic abrasive composites are dispersed in the fluid component; and
wherein the system is configured such that the polishing pad is movable relative to the substrate to carry out a polishing operation.

2. The system for polishing a substrate of claim 1, wherein the base layer comprises polypropylene.

3. The system for polishing a substrate of claim 2, wherein the base layer has a thickness of between 0.125 mm and 10 mm.

4. The system for polishing a substrate of claim 1, wherein the individual abrasive particles are uniformly distributed throughout the porous ceramic matrix.

5. The system for polishing a substrate of claim 4, wherein the abrasive particles comprise diamond, cubic boron nitride, fused aluminum oxide, ceramic aluminum oxide, heated treated aluminum oxide, silicon carbide, boron carbide, alumina zirconia, iron oxide, ceria, or garnet.

6. The system for polishing a substrate of claim 5, wherein the abrasive particles comprise diamond.

7. The system for polishing a substrate of claim 5, wherein the ceramic abrasive composites have an average particle size of less than 500 microns.

8. The system for polishing a substrate of claim 5, wherein the average size of the ceramic abrasive composites is at least about 5 times the average size of the abrasive particles.

9. The system for polishing a substrate of claim 5, wherein the porous ceramic matrix comprises glass comprising aluminum oxide, boron oxide, silicon oxide, magnesium oxide, sodium oxide, manganese oxide, or zinc oxide.

10. The system for polishing a substrate of claim 5, wherein the concentration of the abrasive composites in the fluid component is between 0.065% and 6.5% by weight.

11. The system for polishing a substrate of claim 5, wherein the porous ceramic matrix comprises at least 50% by weight glassy ceramic material.

12. The system for polishing a substrate of claim 5, wherein the porous ceramic matrix consists essentially of glassy ceramic material.

13. The system for polishing a substrate of claim 1, wherein the second major surface is a continuous surface.

14. The system for polishing a substrate of claim 1, wherein the second major surface is a nearly continuous surface.

* * * * *